(12) United States Patent
Ortiz

(10) Patent No.: US 9,119,407 B2
(45) Date of Patent: *Sep. 1, 2015

(54) APPARATUS, SYSTEMS AND METHODS FOR MANUFACTURING FOOD PRODUCTS

(75) Inventor: Oscar Ortiz, Hawthorne, CA (US)

(73) Assignee: Big Heart Pet Brands, San Francisco, CA (US)

( * ) Notice: Subject to any disclaimer, the term of this patent is extended or adjusted under 35 U.S.C. 154(b) by 40 days.

This patent is subject to a terminal disclaimer.

(21) Appl. No.: 13/402,432

(22) Filed: Feb. 22, 2012

(65) Prior Publication Data

US 2012/0237648 A1    Sep. 20, 2012

Related U.S. Application Data

(63) Continuation-in-part of application No. 13/036,795, filed on Feb. 28, 2011, now Pat. No. 8,679,560.

(51) Int. Cl.

| | |
|---|---|
| A23K 1/10 | (2006.01) |
| A23K 1/00 | (2006.01) |
| A23P 1/08 | (2006.01) |
| A22C 17/00 | (2006.01) |
| A23K 1/18 | (2006.01) |
| A23P 1/12 | (2006.01) |
| A22C 25/18 | (2006.01) |
| A22C 25/20 | (2006.01) |

(Continued)

(52) U.S. Cl.
CPC ............. *A23K 1/003* (2013.01); *A22C 17/0026* (2013.01); *A22C 17/0033* (2013.01); *A22C 21/003* (2013.01); *A22C 25/18* (2013.01); *A22C 25/20* (2013.01); *A23K 1/10* (2013.01); *A23K 1/186* (2013.01); *A23K 1/1853* (2013.01); *A23L 1/0047* (2013.01); *A23P 1/081* (2013.01); *A23P 1/12* (2013.01)

(58) Field of Classification Search
CPC ........... A22C 17/0006; A22C 17/0026; A22C 17/0033; A22C 21/003; A22C 25/18; A22C 25/20; A23L 1/0047; A23L 1/0076; A23P 1/12; A23P 1/08; A23P 1/081; A23K 1/003; A23K 1/1846; A23K 1/186; A23K 1/10–1/106
USPC .......... 426/302, 305, 634, 641, 644–646, 443, 426/465, 513, 516, 518–520, 523, 802, 805
See application file for complete search history.

(56) References Cited

U.S. PATENT DOCUMENTS 3,976,799 A * 8/1976 Kelly et al. .................... 426/311
4,055,681 A * 10/1977 Balaz et al. .................... 426/656

(Continued)

*Primary Examiner* — Drew Becker

(57) ABSTRACT

Processes, systems, and articles of manufacture are disclosed relating to edible meat pieces obtained from a continuous process where each piece generally appears to be home cooked on a grill or cooked in a smoke house with randomized sear and grill marks and smoke aroma. The invention, in its various embodiments, provides processes for manufacturing shelf-stable food treats comprising: starting with proteinaceous material (ground or whole), mixing the proteinaceous material with preservatives and flavor enhancers to form a foodstuff, extruding proteinaceous material (if ground) through at least one die opening that is at least partially irregular to form at least one strip of extrudate, cooking the extrudate or whole proteinaceous material to form a cooked product, coating the cooked product with a basting solution, grilling the basted products to obtain grilled products with searing, grill marks, and smoke aroma; and cutting the grilled product at a cutting angle into pieces.

53 Claims, 24 Drawing Sheets

(51) Int. Cl.
*A23L 1/00* (2006.01)
*A22C 21/00* (2006.01)

(56) References Cited

U.S. PATENT DOCUMENTS

| | | | |
|---|---|---|---|
| 4,112,545 A * | 9/1978 | Covington et al. | 426/646 |
| 4,384,009 A * | 5/1983 | Lewis et al. | 426/646 |
| 4,800,094 A * | 1/1989 | Freda et al. | 426/513 |
| 4,868,002 A * | 9/1989 | Scaglione et al. | 426/641 |
| 5,425,307 A * | 6/1995 | Rush et al. | 99/357 |
| 6,238,726 B1 * | 5/2001 | Fischer | 426/644 |
| 6,635,301 B1 * | 10/2003 | Howsam | 426/574 |
| 7,604,829 B2 * | 10/2009 | Schopf et al. | 426/249 |
| 2006/0013939 A1 * | 1/2006 | Schopf et al. | 426/656 |
| 2009/0274800 A1 * | 11/2009 | Assenmacher et al. | 426/129 |
| 2009/0311390 A1 * | 12/2009 | Phelps et al. | 426/129 |
| 2011/0171357 A1 * | 7/2011 | Burroughs et al. | 426/383 |

* cited by examiner

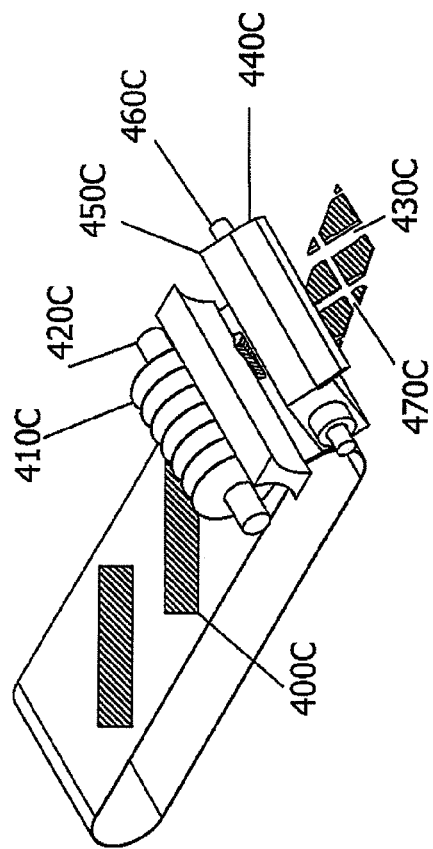
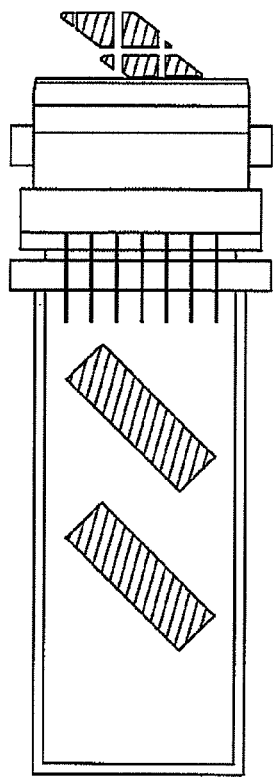
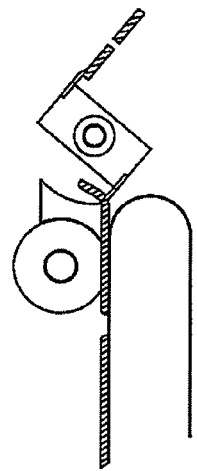
FIG. 4C
FIG. 4A
FIG. 4B

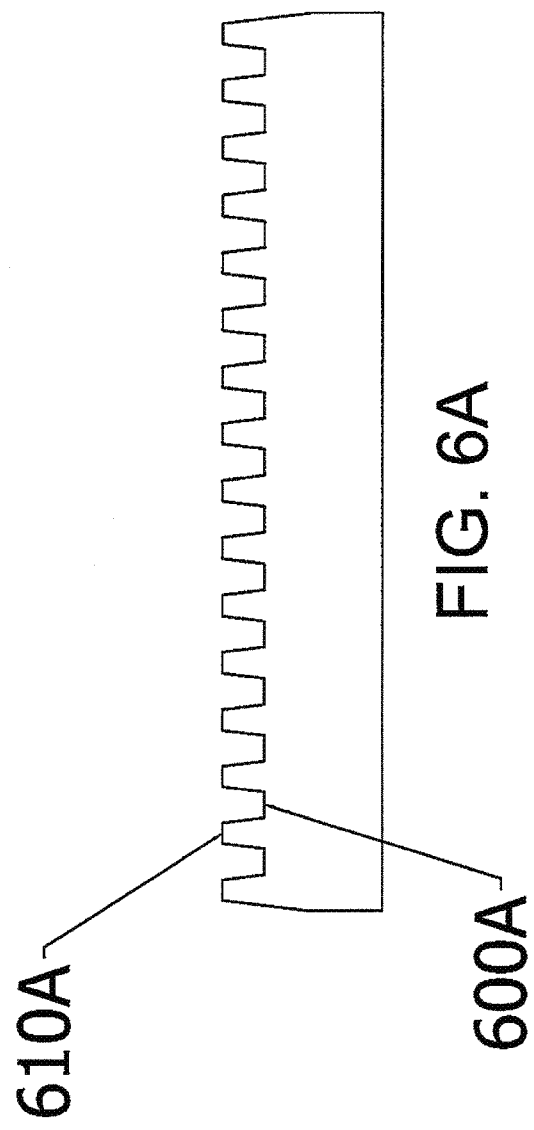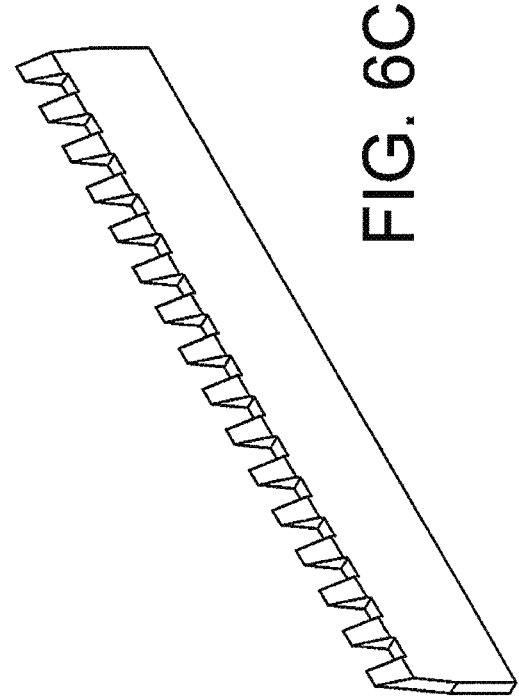
FIG. 6A
FIG. 6B
FIG. 6C

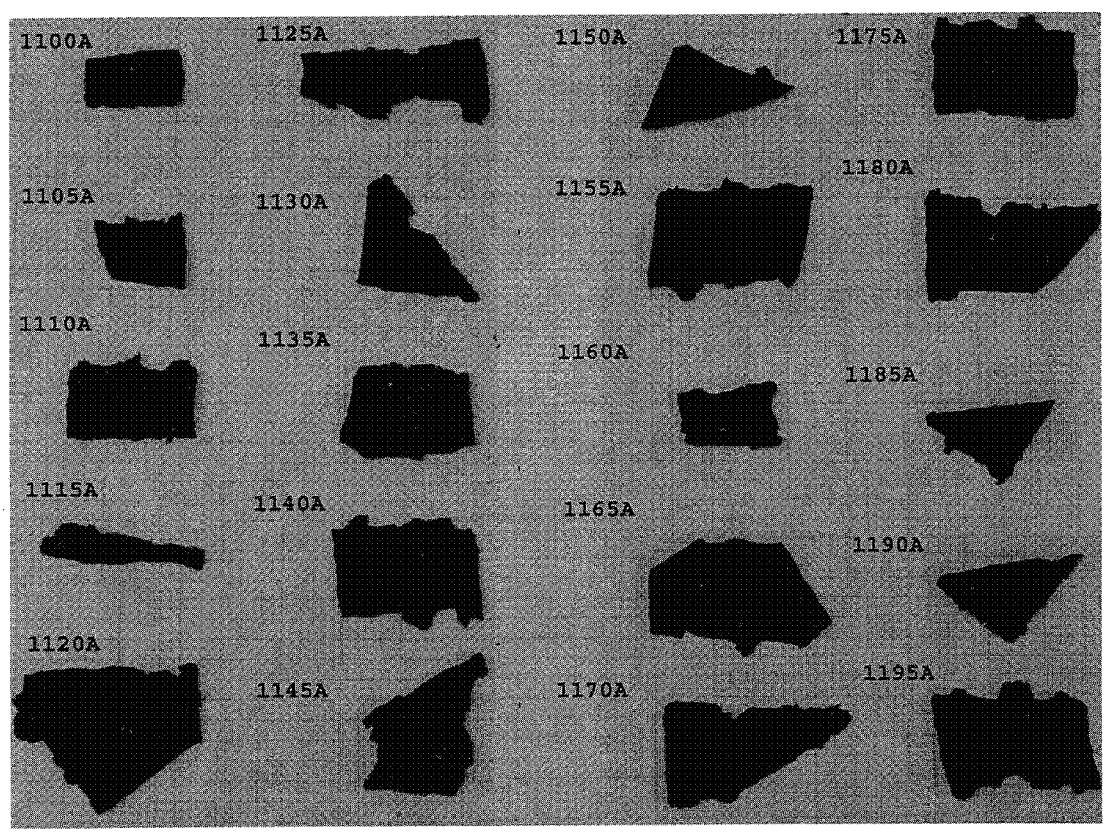
FIG. 11A: Photograph of 20 Beef Jerky Treats from Package

FIG. 11B: Product Distribution in a Package of 20 Jerky Treats
(Dimensions in Inches)

| Piece No. | FIG. 11A ID NO. | Closest Shape | LENGTH** | WIDTH** | THICKNESS** | |
|---|---|---|---|---|---|---|
| | | | | | GREATEST | SMALLEST |
| 1 | 1100A | RECTANGLE | 1.266 | 0.7 | 0.286 | 0.22 |
| 2 | 1105A | TRAPEZOID | 1.1 | 0.8 | 0.28 | 0.28 |
| 3 | 1110A | RECTANGLE | 1.6 | 1.07 | 0.27 | 0.18 |
| 4 | 1115A | RECTANGLE | 2.02 | 0.375 | 0.32 | 0.23 |
| 5 | 1120A | TRAPEZOID | 2.25 | 1.82 | 0.27 | 0.19 |
| 6 | 1125A | RECTANGLE | 2.4 | 1.15 | 0.23 | 0.13 |
| 7 | 1130A | TRIANGLE | 2.05 | 1.15 | 0.27 | 0.19 |
| 8 | 1135A | RECTANGLE | 1.7 | 1.25 | 0.27 | 0.19 |
| 9 | 1140A | PARALLELOGRAM | 1.8 | 1.4 | 0.32 | 0.16 |
| 10 | 1145A | TRIANGLE | 2.1 | 1.43 | 0.26 | 0.16 |
| 11 | 1150A | TRIANGLE | 2.1 | 1 | 0.41 | 0.41 |
| 12 | 1155A | PARALLELOGRAM | 2 | 1.375 | 0.32 | 0.19 |
| 13 | 1160A | RECTANGLE | 1.26 | 0.7 | 0.29 | 0.29 |
| 14 | 1165A | TRAPEZOID | 1.2 | 1.3 | 0.27 | 0.23 |
| 15 | 1170A | TRAPEZOID | 2.26 | 1.23 | 0.27 | 0.27 |
| 16 | 1175A | RECTANGLE | 2.26 | 1.23 | 0.29 | 0.29 |
| 17 | 1180A | TRAPEZOID | 1.93 | 1.27 | 0.33 | 0.19 |
| 18 | 1185A | TRIANGLE | 2.3 | 1.27 | 0.26 | 0.18 |
| 19 | 1190A | TRIANGLE | 1.65 | 0.96 | 0.18 | 0.18 |
| 20 | 1195A | PARALLELOGRAM | 2 | 1.36 | 0.3 | 0.18 |

** *Approximate nominal dimensions of irregular pieces of FIG. 11A.*

APPARATUS, SYSTEMS AND METHODS FOR MANUFACTURING FOOD PRODUCTS

CROSS-REFERENCE TO RELATED APPLICATION

This continuation-in-part application claims the priority and benefit of U.S. patent application Ser. No. 13/036,795, entitled "Apparatus, Systems and Methods for Manufacturing Food Products," filed Feb. 28, 2011 and issued as U.S. Pat. No. 8,679,560 on Mar.25, 2014.

FIELD OF THE INVENTION

The present invention generally relates to apparatus, systems and methods for manufacturing food, more specifically jerky-styled pet food products of variable thickness and texture, in irregular, randomized shapes and sizes, and, also, semi-moist food products of variable thickness and texture sliced into randomized shapes and sizes with a smoked essence and surfaces that are seared and grilled. The present invention also relates to food products including manufactured food products that appear to have been home cooked on a grill and sliced into pieces.

BACKGROUND OF THE INVENTION

A large and growing number of households have pets. Studies have shown that pet owners often treat their pets as they treat close friends and relatives. Owners include pets in holiday celebrations, and often refer to themselves as parents of their pets. Such affinity is tangibly demonstrated in the rapid growth of a multibillion dollar pet industry with an increasing demand for pet products that mimic human products.

Health conscious consumers are also demanding higher quality pet food that is not only closer in ingredient quality to human food, but also looks less processed and more natural. However, conventional pet food producers seldom focus on the visual impact of pet food that heightens aesthetic appeal to a purchaser, even if they integrate advanced ingredients more commonly found in food produced for human consumption. Since a traditional manufacturing goal is reproducibility and uniformity, industrial cutting machines used in these conventional pet food processes are primarily designed to deliver products with consistency in shape, texture and size. Therefore, pet food packages typically contain edible pieces, or kibbles, where each kibble is generally of uniform shape and size, often readily appearing glazed or processed. For example, pet jerky treats are made by extrusion through generally uniform die openings, producing strips or rods that are typically uniform in shape, and which are then typically cut in uniform pieces that are rectangular (flat) or cylindrical (rod) in appearance. Pet food resembling red meat marbled with fat has been made by extruding or pressure casting a blend of red meat and white fat, but the end product is again a plurality of food pieces of generally uniform shape and size.

Manufacturing techniques used to produce human food are often not cost effective for pet foods. For example, jerky-style products for human consumption are made from sliced premium muscle meat, and contain almost no grains, starch or carbohydrates. Because of the high concentration of muscle meat and fat, increased time is required for processing of human grade jerky, especially drying. The increased use of meat, lack of carbohydrates, and the slower drying process results in a final product that shrinks and forms into long strips of randomly wrinkled meat, in the distinct rugged appearance of natural jerky with which consumers are familiar, and often associate with higher quality.

While human grade jerky may certainly be used as pet food, it would be cost prohibitive for most pet owners. This is because human grade jerky is primarily marinated meat, often costly premium meat. When the product is almost 100% meat, it also becomes difficult to process efficiently in high volumes, thereby increasing processing time and costs. To reduce ingredient costs, pet jerky treats use lower amounts of meat (typically 20-40%), and usually do not use any premium muscle meat. To compensate for lower amounts of meat in pet jerky, 20-40% of flour or starches must be added, along with other ingredients such as vegetables, preservatives, and flavor enhancers. Besides lowering ingredient costs, the flour and starch significantly improve processing ability for high volume manufacturing, further reducing production times and costs.

Human grade jerky is usually designed for relatively short shelf lives. Pet food, on the other hand, is engineered to be stored (if necessary) for eighteen months after manufacturing before it is consumed, and therefore requires a substantially longer shelf life. Human grade jerky packets, once opened, become stale in less than a week. Pet jerky, however, is expected to last for up to three months after the package is opened. The delay in the storage and consumption of pet foods requires more careful ingredient selection, preservation of freshness with antioxidants, processing that avoids insects and rancidity, careful packaging and storage. This kind of food processing, with a higher mix of inexpensive ingredients, particularly carbohydrates, lends itself well to traditional extrusion techniques.

Since high moisture meat products tend to spoil quickly, such products are usually sold in cans in the pet food market, and are more typical as cat food. Pet food or kibble with low moisture content (typically less than 10%), are dry and hard, and less palatable to pets. Semi-moist pet food, typically having moisture content between 15 and 30%, is very popular with animals since it has a texture and palatability that is closest to meat. However, as discussed, semi-moist pet food is difficult to store in a stable condition, without canning or refrigeration, for long periods Thus, neither conventional pet food manufacturing processes nor traditional production techniques of jerky-style products for human consumption can meet the requirements of cost-effectively manufacturing jerky products for pets of variable thicknesses, texture, surface appearance, and non-uniform shapes and sizes that remain semi-moist and shelf-stable without refrigeration for long periods under normal storage conditions. Furthermore, there is no conventional food processing method for either pet or human food that can produce a continuous line of jerky pieces that mimic the natural, irregular, wrinkled and rugged look and feel of human grade jerky produced traditionally.

Furthermore, there is also no method that can produce pieces of food product, including manufactured (i.e., extruded) food product, having a smoke-house or home-cooked appearance with searing, grill marks, and aromas that mimic grilled meat. Neither conventional pet food manufacturing processes nor traditional production techniques for food products for human consumption meet the requirements of cost-effective manufacturing of food products for pets, characterized as semi-moist, randomized sizes, and home-cooked or cooked in a smoke house that are shelf-stable without refrigeration for long periods under normal storage conditions. There is also no conventional food processing method for either pet or human food that can produce a continuous line of food products for pets that mimic the inherent look, feel and aroma of human grade meat that has been grilled at home or cooked in a smoke house.

SUMMARY OF THE INVENTION

Illustrative embodiments of the present invention include apparatus, systems and methods for manufacturing a plurality of edible pieces in a continuous process where each piece is generally different in thickness, shape, size, and texture, from another piece, so as to create, in the aggregate, product pieces of randomly varying thickness, size, shape and/or texture. More specifically, the various embodiments provide a method to manufacture a pet jerky treat that is not only of good nutritional quality, but also mimics the natural, wrinkled, rugged and random appearance and texture of jerky products that are designed for human consumption.

Furthermore, the various embodiments of the invention provide methods for manufacturing a plurality of edible pieces of food products in a continuous process where each piece generally appears to have been grilled at home by presenting the characteristics expected of grilled meat, i.e., searing, grill marks, and smoke essence. In an illustrative embodiment, the food products, including pet treats, are manufactured from proteinaceous material such as, for example, whole pieces of chicken breast or chicken tender meat. In addition, the food products, including pet treats, are manufactured from ground proteinaceous material, such as, for example, ground premium chicken meat, which is extruded through a die to provide the general appearance of a whole piece of meat. The extrudate may appear, when cooked, to be a grilled whole chicken breast. In these embodiments, the food products are a plurality of edible pieces where each piece is generally different in size and surface appearance, from another piece, so as to create, in the aggregate, random pieces of food product. These embodiments also provide pieces of food product which appear to have been cooked in a smoke house or at home on a grill and emit aromas of grilled meat.

More specifically, one illustrative embodiment of the present invention provides a process for manufacturing pet jerky treats comprising: grinding proteinaceous material, mixing said proteinaceous material with preservatives and flavor enhancers to form a blend of foodstuff, extruding said foodstuff through at least one die opening that is at least partially irregular to form at least one strip of extrudate that is at least partly irregular in shape, transporting said strip in a first longitudinal direction to a first cutting operation, cutting said strip at a first cutting angle to form a first set of pieces, transporting said first set of pieces in a second longitudinal direction to a second cutting operation, cutting said first set of pieces in said second cutting operation at a second angle to form a second set of pieces, such that the said second set of pieces cumulatively produced during a process run generally appear to be of random sizes and shapes.

Another illustrative embodiment of the invention provides a process for preparing a grilled food product, such as pet treats, comprising: infusing whole pieces of proteinaceous material (e.g., whole chicken breast and/or tender meat) under vacuum with preservatives and flavor enhancers; cooking the infused proteinaceous material; coating the cooked proteinaceous material with a basting solution having smoke essence; grilling the basted proteinaceous material on one or more sides; cutting the grilled proteinaceous material with a cutting element configured to make compound slices through the food product at a first angle from about 30 degrees to about 150 degrees from a generally flat cutting surface (on which the food product rests) and a second angle from about 25 degrees to about 155 degrees to the long axis of the grilled food product; and dehydrating the sliced pieces of food product to reach finished specifications.

A further illustrative embodiment of the invention provides a process for preparing a grilled food product, such as pet treats, comprising: extruding through at least one die opening an emulsion of ground proteinaceous material blended with preservatives and flavor enhancers to obtain an extrudate; pulling the extrudate from the die to create stress and partial tears in the extrudate; cooking the extrudate so that it is semi-rigid and then coating the cooked extrudate with a basting solution having a smoke essence; grilling the coated extrudate on one or more sides; and cutting the grilled extrudate with a cutting element configured to make compound slices through the food product at a first angle from about 30 degrees to about 150 degrees from a generally flat cutting surface (on which the food product rests) and a second angle from about 25 degrees to about 155 degrees to the long axis of the grilled food product, and dehydrating the sliced pieces of food product to reach finished specifications.

While embodiments are described primarily with respect to food products, pet jerky products, and pet treats in particular, the disclosed apparatus, systems and methods may be applied to the cost-effective production of a broad range of food products, whether intended for pet or human consumption.

It will be appreciated by those skilled in the art that the foregoing brief description and the following detailed description are exemplary and explanatory only, and are not intended to be restrictive thereof or limiting the invention. Thus, the accompanying drawings, referred to herein and constituting a part hereof, illustrate only preferred embodiments of the invention, and, together with the detailed description, serve to explain the principles of the invention.

BRIEF DESCRIPTION OF THE DRAWINGS

FIGS. 4A, 4B and 4C show details of the cutting/shredding process of FIG. 3A, according to an illustrative embodiment of the invention.

FIGS. 6A, 6B and 6C shows different views of the notched cross cut blade used in the cutting/shredding process (350) of FIG. 3A, according to an illustrative embodiment of the invention.

FIG. 11A shows a photograph of 20 beef jerky treats in generally random sizes, shapes and textures, which were made according to an embodiment of the invention.

FIG. 11B shows approximate nominal dimensions of the 20 irregular product treats shown in FIG. 11A.

FIG. 12 shows a photograph of 24 pieces of pet treats with a grilled-at-home appearance, which were made from ground premium white chicken meat, according to an embodiment of the invention generally described in FIG. 1C.

DETAILED DESCRIPTION OF PREFERRED EMBODIMENTS OF THE INVENTION

Illustrative and alternative embodiments and operational details of apparatus, systems and methods to manufacture a plurality of irregular, random edible pieces of varying texture and/or surface characteristics in a continuous process will be discussed in detail below with reference to the figures provided. One preferred product, however, is an edible food product for animal consumption, more particularly a pet treat or jerky containing meat or meat analogs. Another preferred product is an edible food product for animal consumption, in particular a pet treat containing meat or meat analogs which appear to have been grilled at home or cooked in a smoke house and which exhibit smoke essence.

Figure 1A:
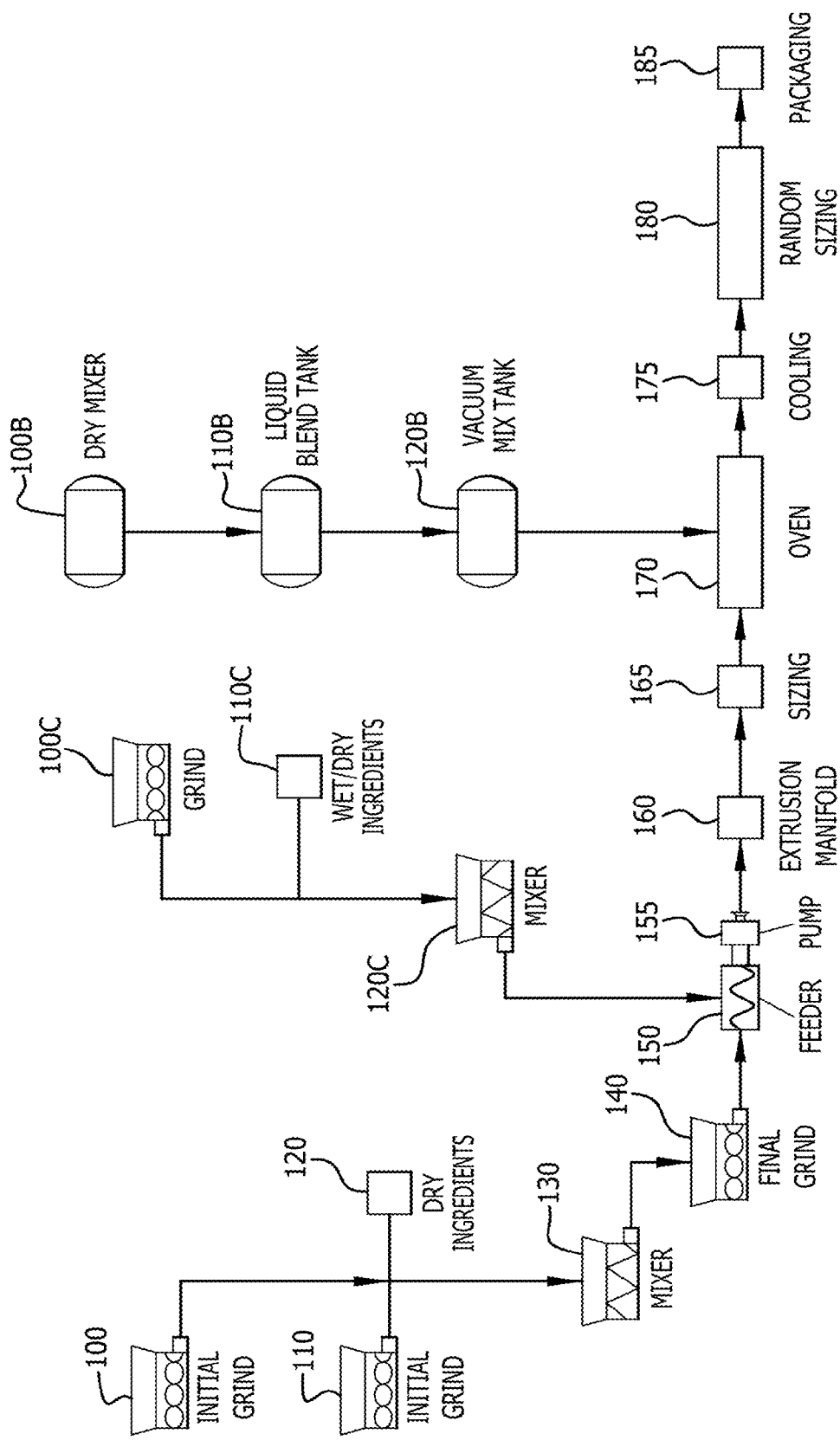
FIG. 1A is a general overview of the processes of the present invention for making food products, according to illustrative embodiments of the invention.

In one illustrative embodiment of the invention shown in FIG. 1A, frozen blocks of premium muscle meat or any appropriate proteinaceous material are processed through a first grinder (100). This grinder has relatively large grinder plate openings (larger than ½×1½ inches in nominal diameter but no larger than 4×7 inches each), resulting in large chunks of meat with more longitudinal grains. A variety of geometrical and non-geometrical shapes can be used for the grinder plate openings (e.g., rectangular, trapezoid, teardrop, etc.) to add to the textural properties of the final product. Frozen blocks of pet grade meat are processed through a second grinder (110) with smaller grinder plate openings (larger than ⅟16" diameter but smaller than 1" diameter). This dual grinding step and/or the use of premium muscle meat can also contribute to the appearance and texture of the final jerky product.

The ground meat is batched and mixed in a ribbon flight mixer (130), typically a ribbon flight mixer, sigma blade, solid screw or any similar mixing equipment common in food processing. Dry ingredients (120) are added to the meat batch in the mixer, and the details of the ingredients and proportions are described in TABLE 1, further below. The mixed batch is processed with a third grinder (140) that assists in the consistent mixing of both longitudinal grains and smaller chunks of meat in such a way that the resultant meat emulsion can be extruded easily. This additional grinding step can also contribute to the appearance and texture of the final jerky product. Note also that while the grinding and mixing steps described herein are a preferred embodiment, similar results can also be attained by separately sourcing pre-ground (and pre-mixed) proteins and other ingredients, and then using this externally sourced ground mix as the starting raw material to carry out the rest of the process steps described in FIG. 1A and below.

Figure 2A:
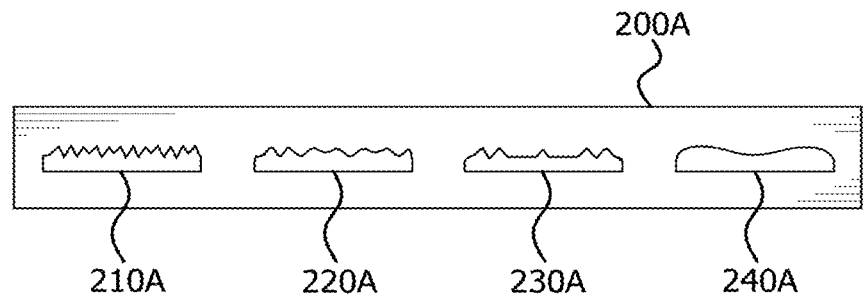
FIGS. 2A and 2B show details of an extrusion manifold for the extruding processes (160, 130C) of FIGS. 1A-1C, according to an illustrative embodiment of the invention.
Figure 2B:
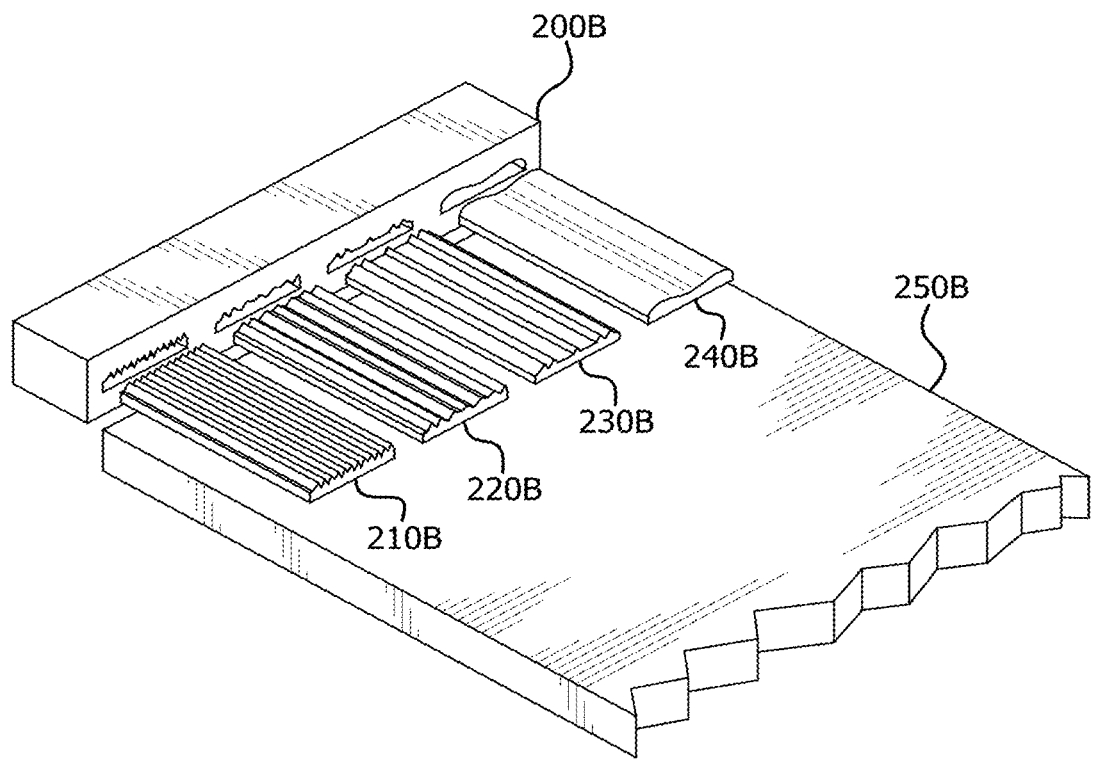

After the final grind (140), the meat emulsion is fed (150) to a positive displacement pump (155), from which it is conveyed to an extrusion manifold (160). Here, the product is extruded through an extrusion manifold having generally irregular die openings. Irregular as referred to herein, indicates that the die opening can be shaped in any combination of linear, non-linear, curved, geometric, symmetrical or non-symmetrical, uniform or non-uniform pattern that can vary across the nominal dimensions of the die opening. Further, part of the contour of the die opening can be regular and uniform whereas the rest of the contour is irregular, as for instance a rectangular slit where one of the sides of the rectangle is replaced by a wavy or non-linear pattern. For clarity, an illustrative embodiment of such an extrusion manifold is detailed in FIG. 2A (item 200A) and the corresponding isometric view in FIG. 2B (item 200B). The die openings and/or inner surfaces of the extrusion manifold (160, 200A, 200B) can have a variety of patterns of differing dimensions and shapes as illustrated in 210A, 220A, 230A or 240A. When the meat emulsion is extruded through this manifold, it produces extruded strips of varying thickness and shapes with a unique texture, as shown in FIG. 2B. For instance, the jerky strips can be extruded through a die containing several slots having various waved or ridged patterns, with a resulting interim product distribution having a range of surface contour patterns, from a smooth transitioned wave pattern (240B) to a more granular rippled surface (210B). Further, the bottom of one or more of the extrusion die openings (210A, 220A, 230A or 240A) can also be of varying or irregular shape. It must also be emphasized that, because of further downstream processing (described below), extrusion die openings of substantially regular and uniform linear patterns can also be used in this step of the process to achieve a similar end result, so long as at least one of the extruder die openings used in the process is at least slightly irregular, e.g., has a curved or non-linear contour.

In FIG. 2B, four strips (210B-240B), typically about 2½" wide, are extruded continuously, cut with any typical post-extrusion cutting process (water jets, pinching cleats, knife blades, etc.) onto 12"×48" long plastic trays (250B) transferred with a belt conveyor. Cleats are preferred. This step acts as an initial product sizing operation (165). Note, however, that the product could also be extruded directly onto a continuous belt conveyor. The number and size of the extrusion patterns and openings, whether they are of similar or different sizes, may vary, and is related to the width of the trays or belt used in the process. If trays are used, the extrudate (210B-240B) is cut to the length of the trays (250B) with the cleats, and the trays are then conveyed over a roller to the next step, drying (170) for about 4-5 hours. Typically, a continuous oven dryer is used, though any similar equipment used in food processing will suffice.

As shown in FIG. 1A, the extrudate is then dried in an oven (170) between 130-250° F., for 4-8 hours, depending on the dimensions of the strips, initial product moisture, etc. The higher the temperature, the shorter the drying time required. The temperature and drying profiles are important to prevent the generation of skin or excessive dehydration or shriveling of the product. After drying, the jerky is cooled (175) for 1-4 hours, typically at ambient temperature, before continuing to the next step of the process: random sizing (180). The drying and cooling process conditions and parameters also contribute to the final texture and roughness of the finished product.

Random sizing as referred to herein is the process of making smaller pieces from the extrudate strips (e.g., 210B) in such a way that each piece made generally appears to be different in terms of thickness, shape, size and/or texture from subsequently or previously produced pieces. This creates, in the aggregate, pieces of varying thickness, size, shape and/or texture that simulate an overall collection of haphazard, unsystematic or non-uniform collection of pieces that appear to have no governing design or method. The goal is to simulate the natural, wrinkled, rugged and non-uniform appearance of human grade jerky products but, as one skilled in the art will appreciate, this goal can rarely be completely realized, and a reasonable amount of variation is sufficient in actual practice. To emphasize, random sizing is not intended to mean that a particular piece is always designed to be different in dimension, shape or texture from another piece, or that there will not be two or more identically (or even similarly) shaped or sized pieces that could be found in a collection of pieces that are produced in any process run. FIGS. 11A and 11B are a further illustration of type of irregular and arbitrary product sizes and shapes that can be achieved through an illustrative embodiment of the present invention.

Figure 3A:
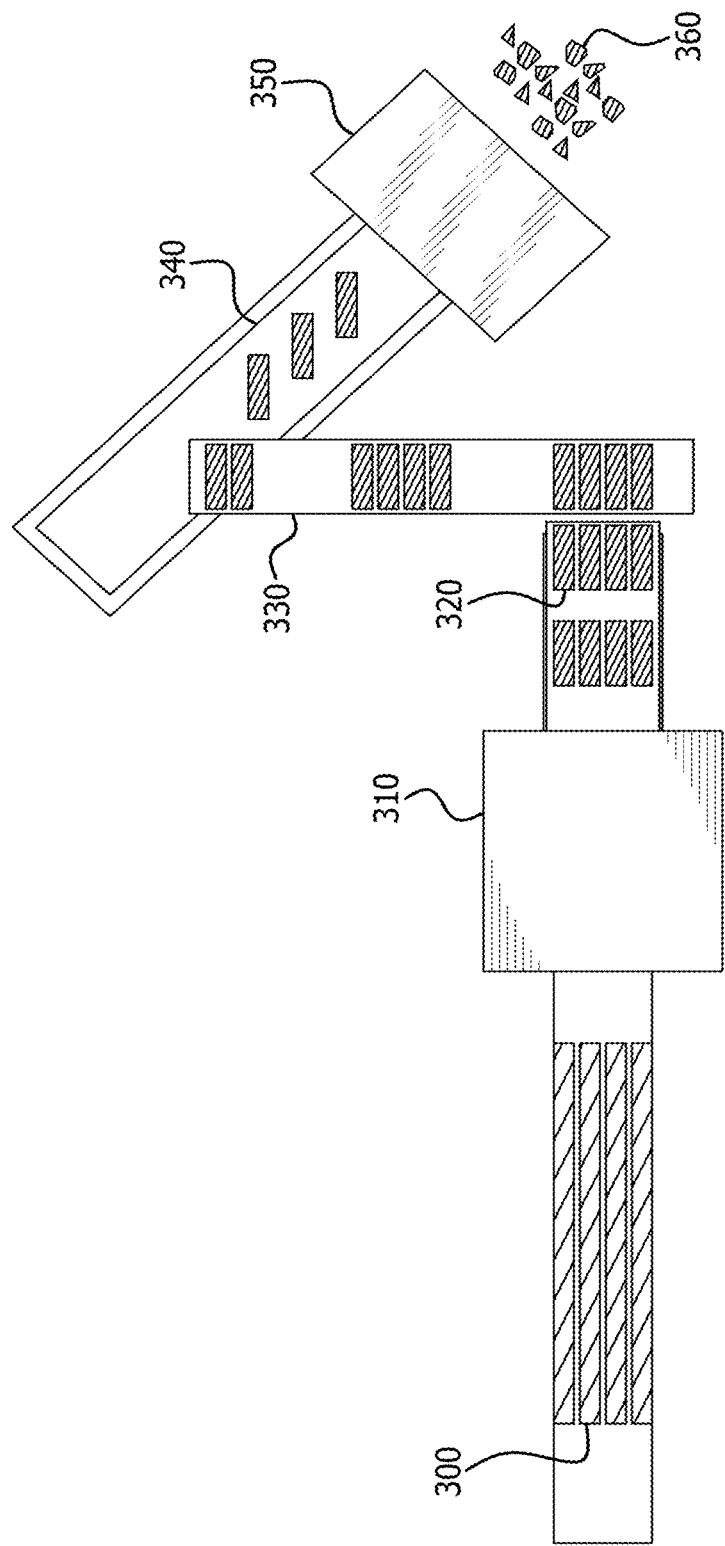
FIG. 3A is a more detailed overview of a random sizing step (180) of the processes in FIGS. 1A-1C, according to an illustrative embodiment of the invention.
Figure 3B:
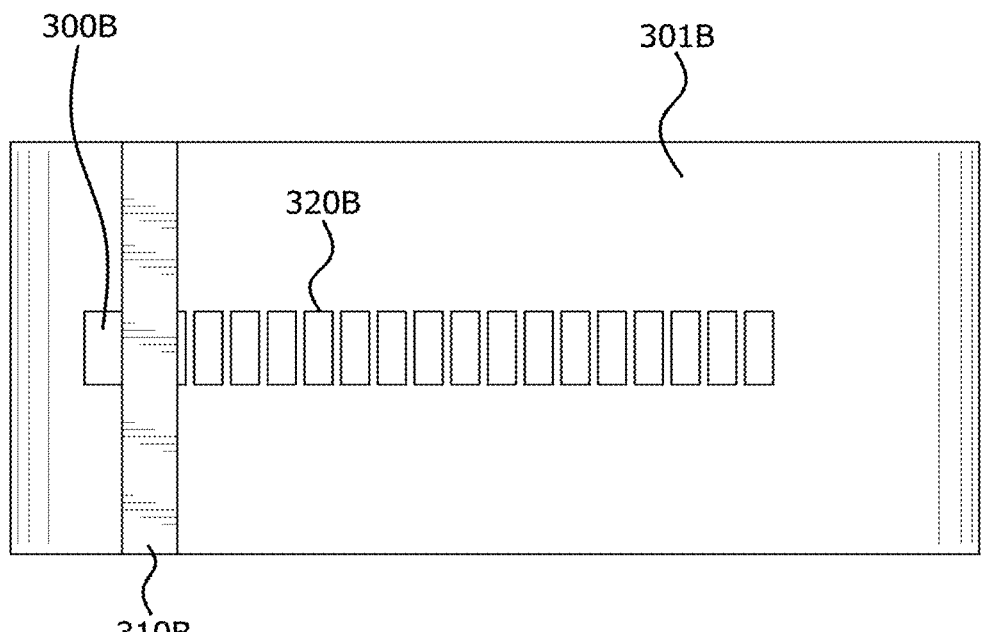
FIGS. 3B, 3C, 3D and 3E is a detailed overview of a cutting operation (180, 170B, 160C, 175C) of the processes of FIGS. 1A-1C, according to an illustrative embodiment of the invention.
Figure 3C:
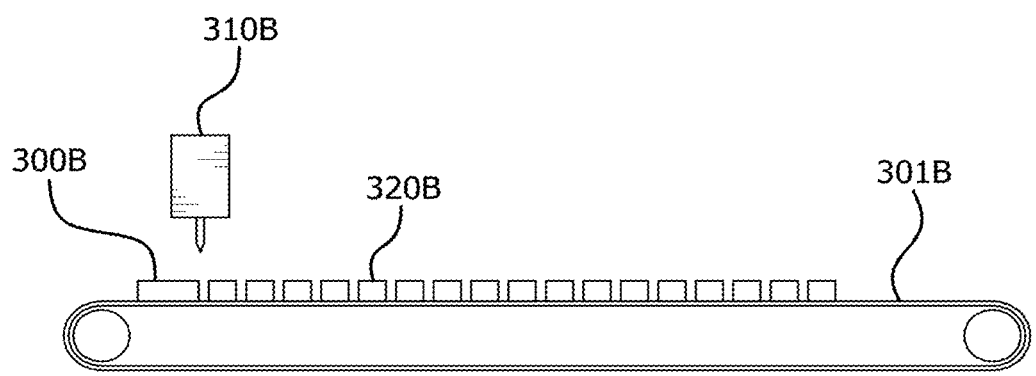
Figure 3D:
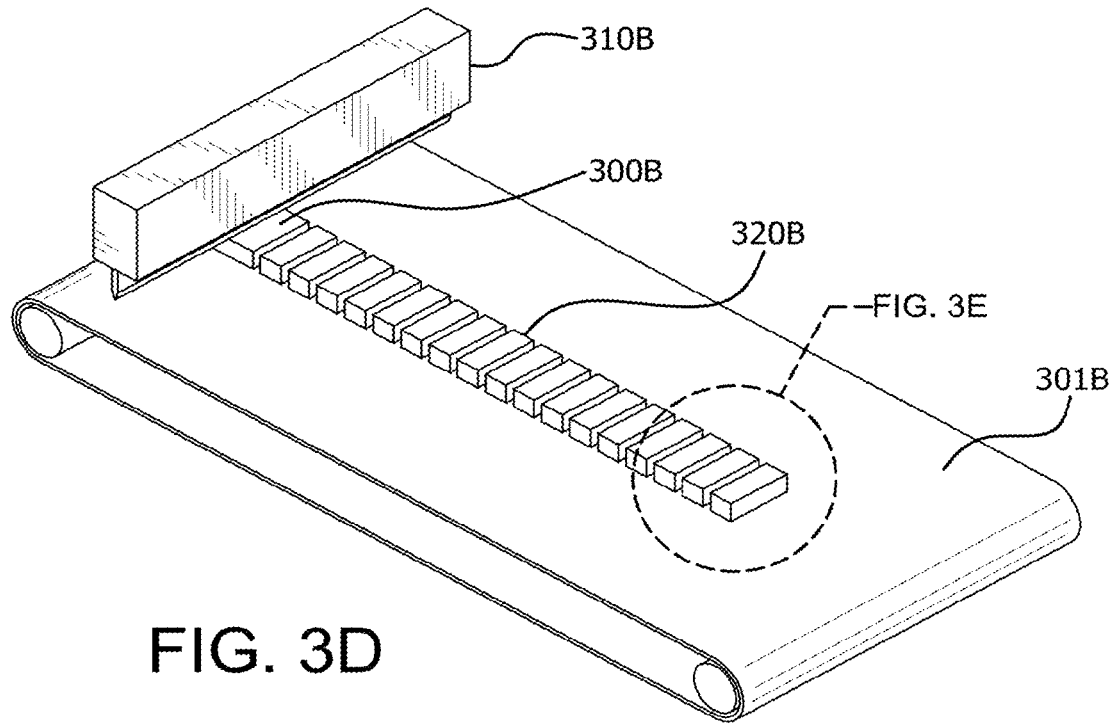
Figure 3E:
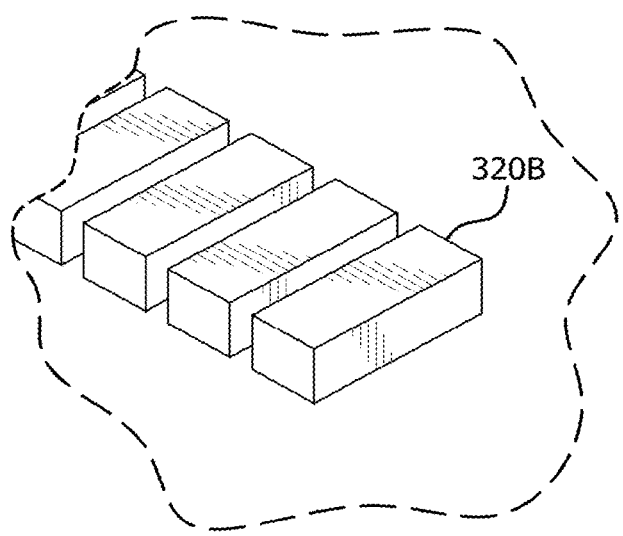
Figure 3F:
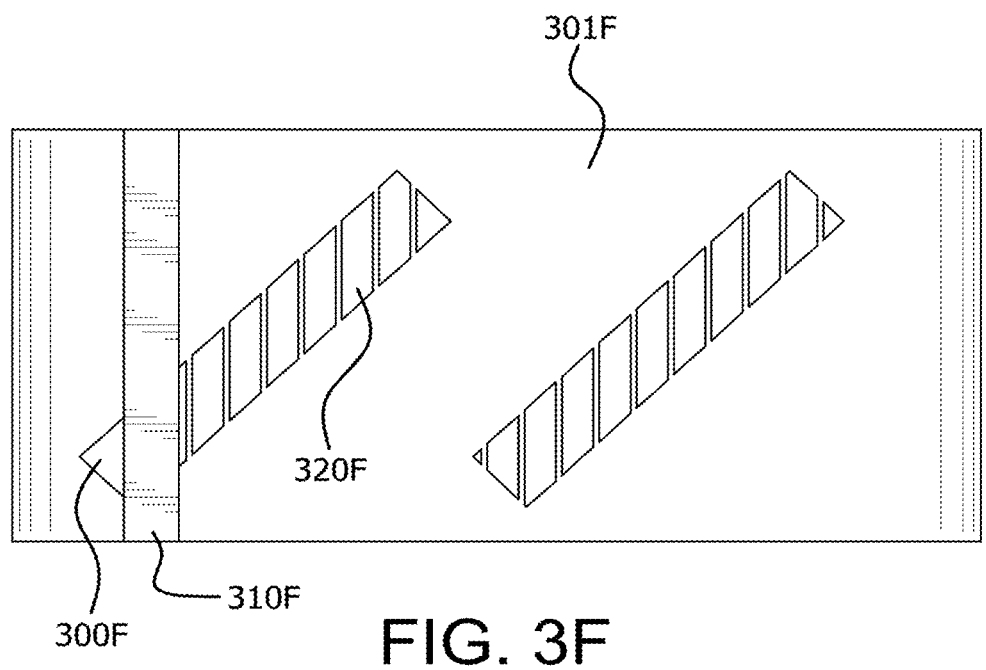
FIGS. 3F, 3G, 3H and 3I is a detailed overview of a cutting operation (180, 170B, 160C, 175C) of the processes of FIGS. 1A-1C, according to an illustrative embodiment of the invention.
Figure 3G:
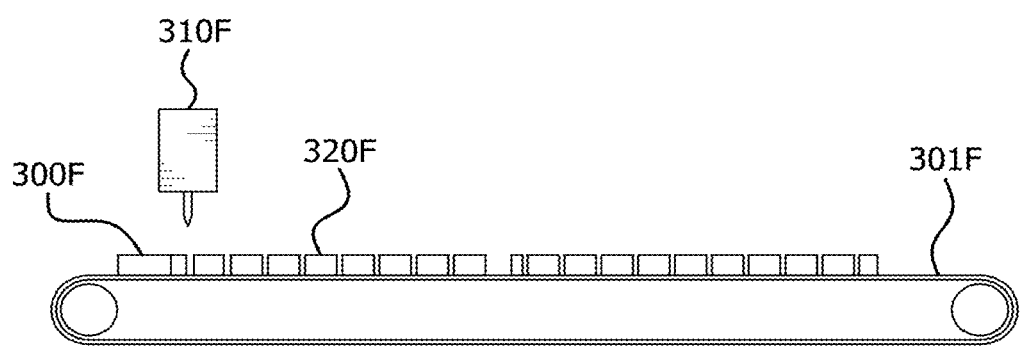
Figure 3H:
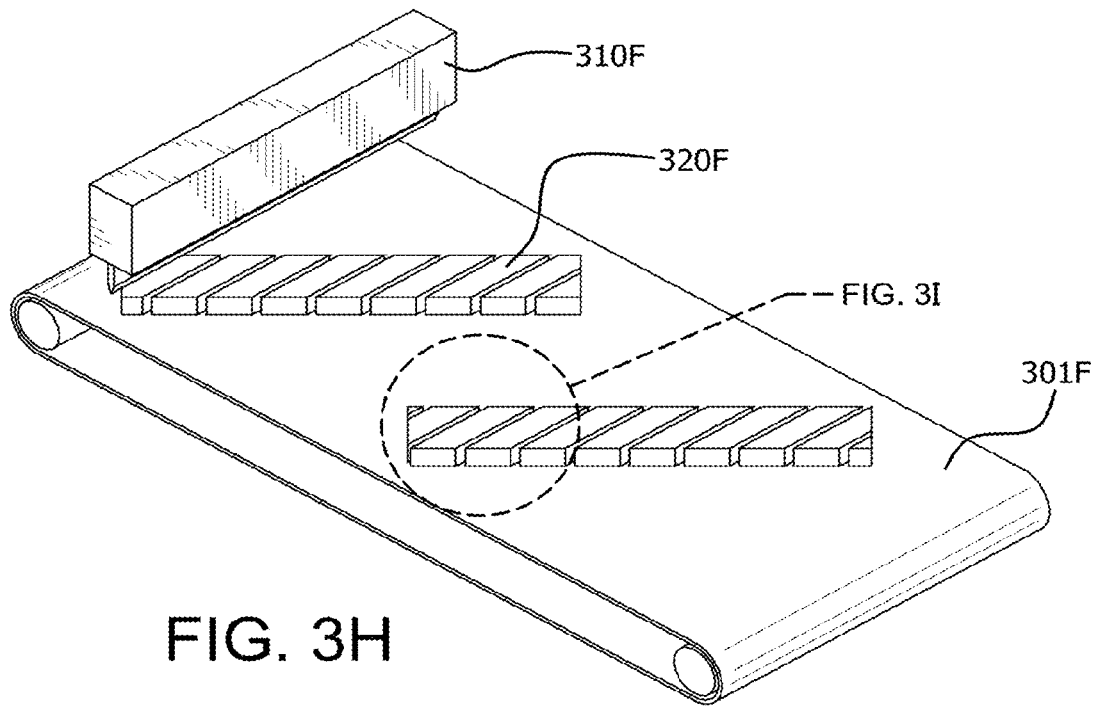
Figure 3I:
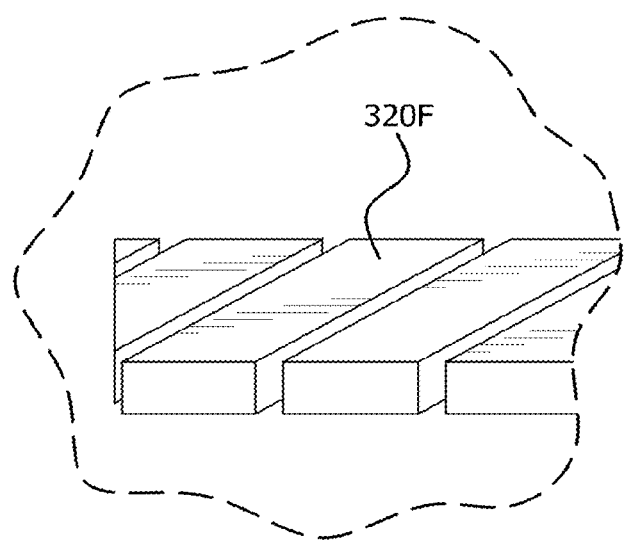
Figure 3J:
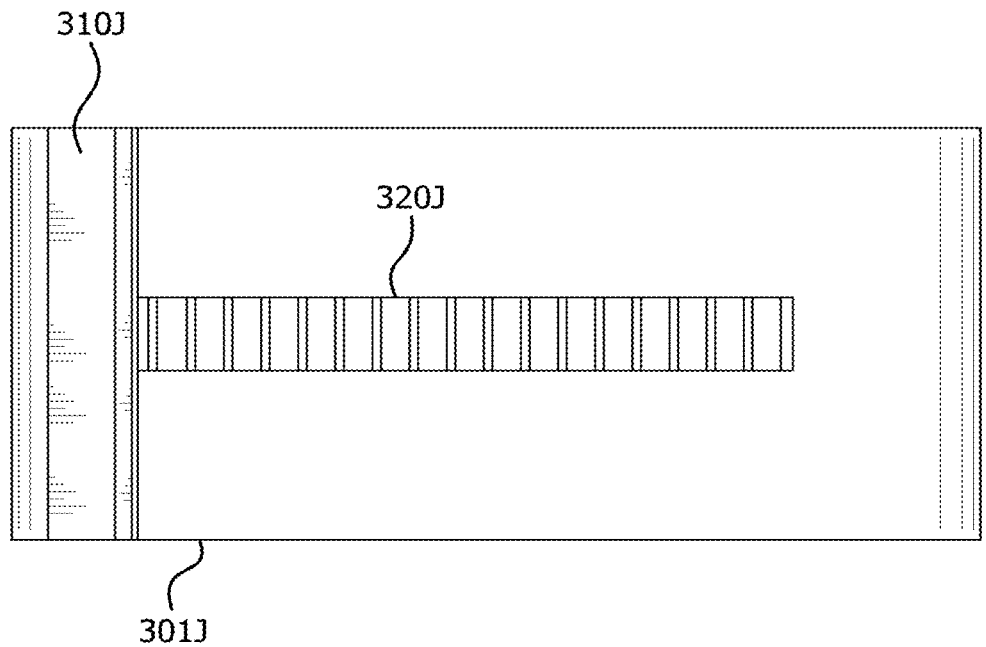
FIGS. 3J, 3K, 3L and 3M is a detailed overview of a cutting operation (180, 170B, 160C, 175C) of the processes of FIGS. 1A-1C, according to an illustrative embodiment of the invention.
Figure 3K:
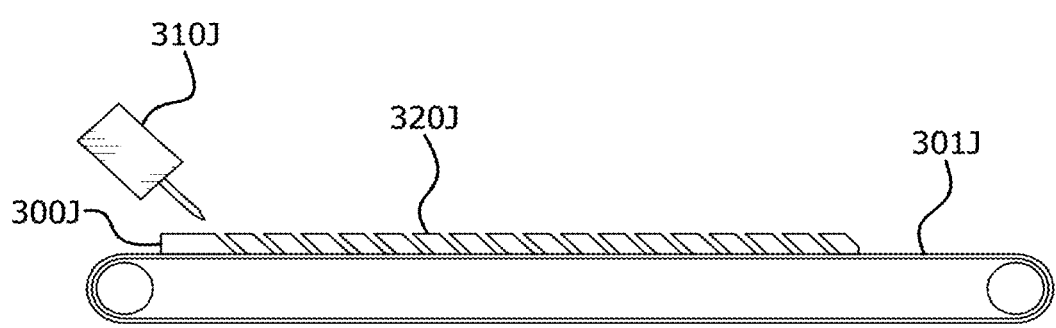
Figure 3L:
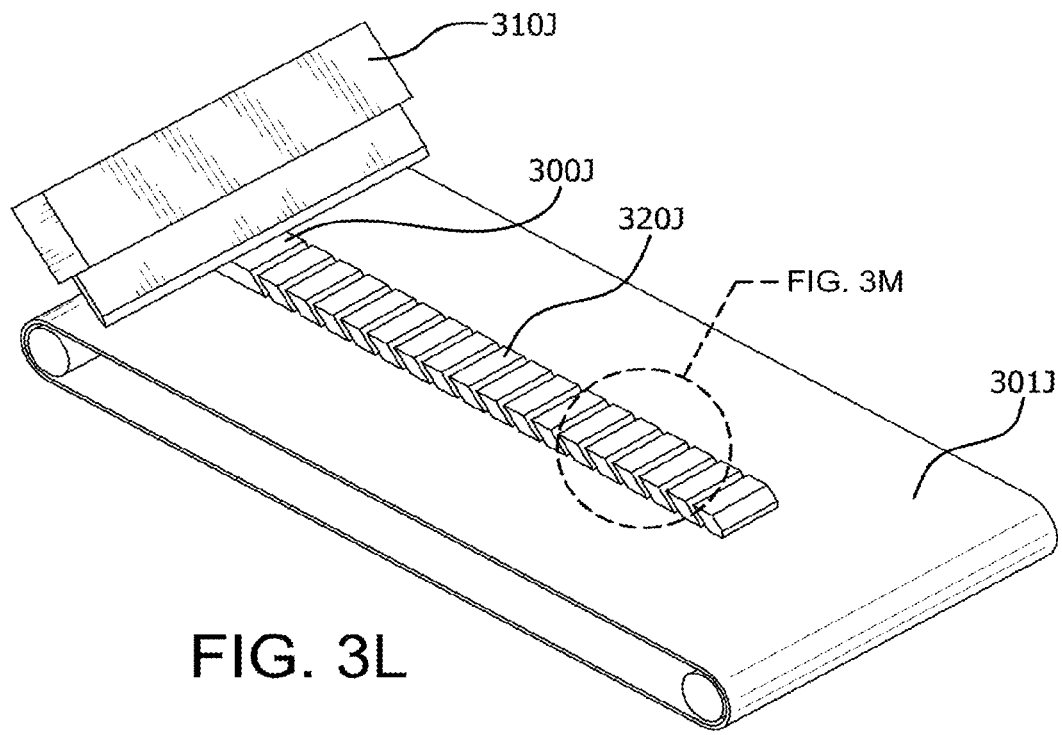
Figure 3M:
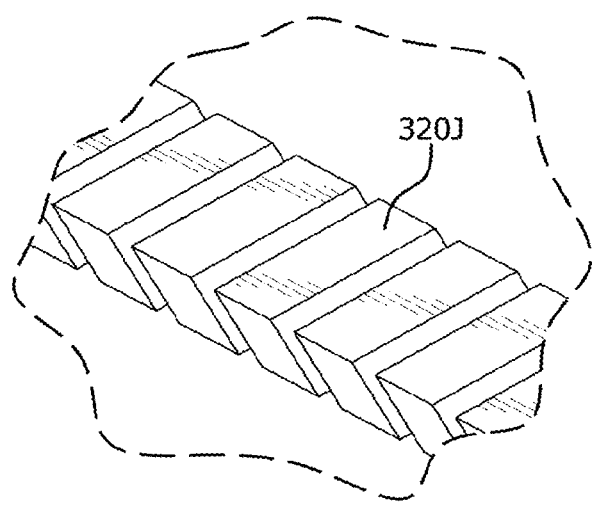
Figure 3N:
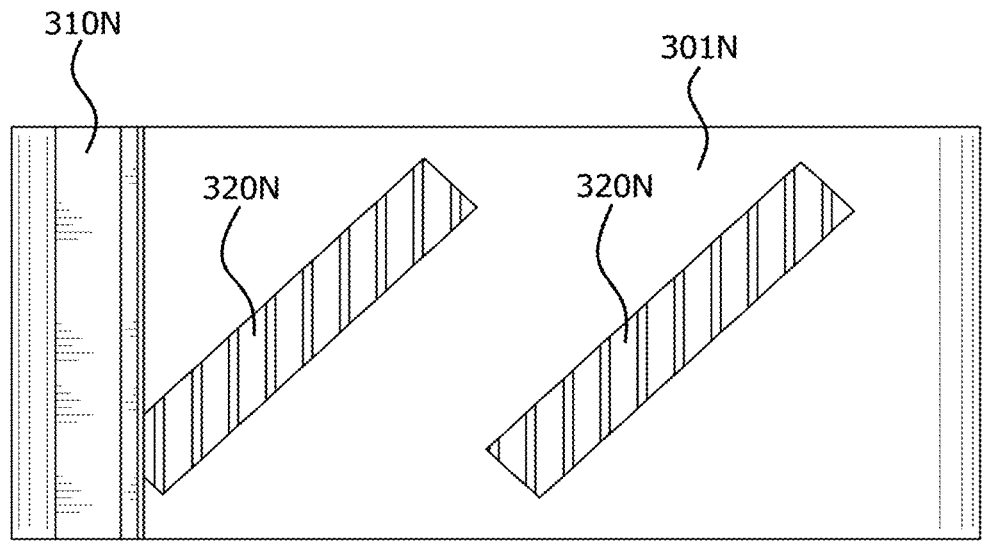
FIGS. 3N, 3O, 3P and 3Q is a detailed overview of a cutting operation (180, 170B, 160C, 175C) of the processes of FIGS. 1A-1C, according to an illustrative embodiment of the invention.
Figure 3O:
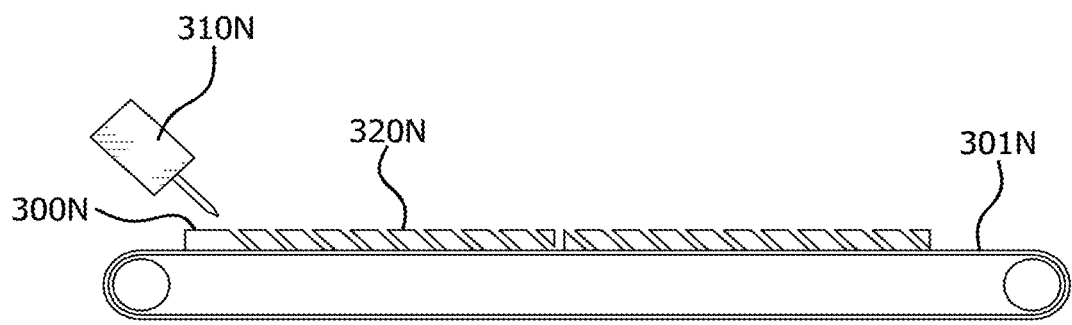
Figure 3P:
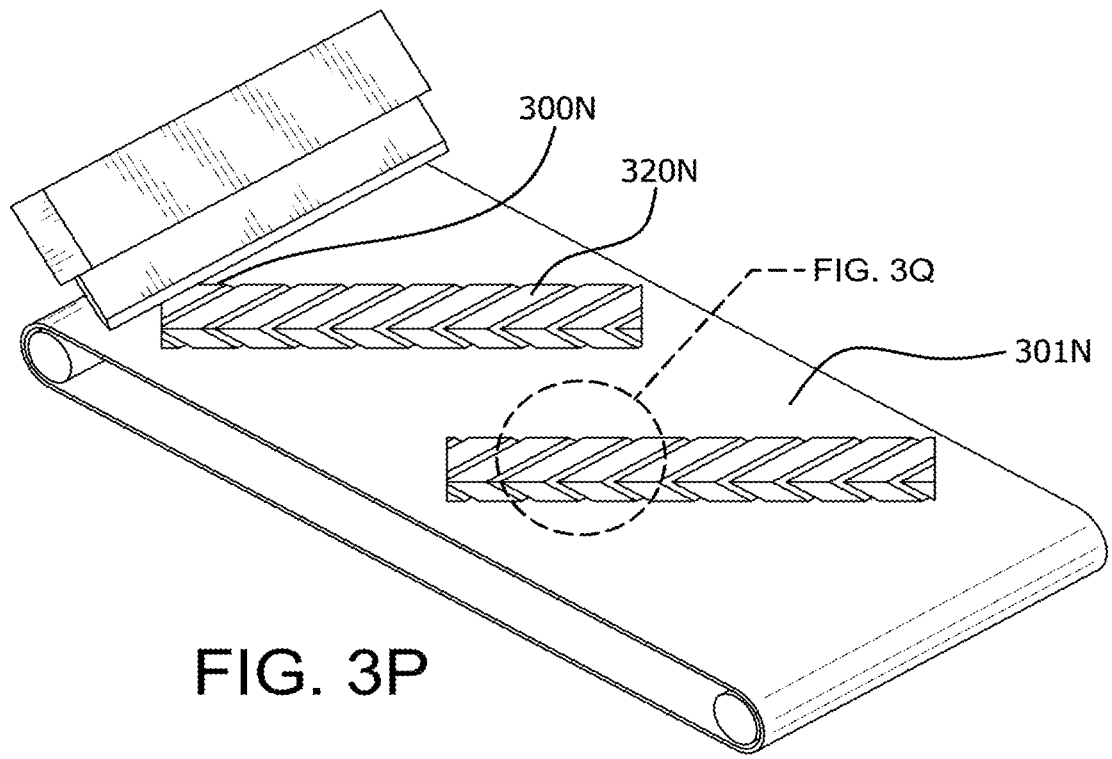
Figure 3Q:
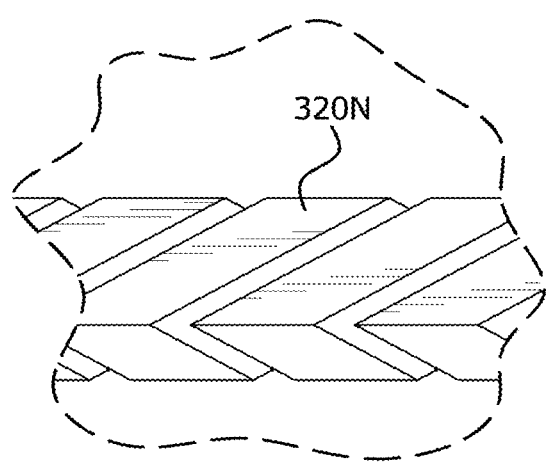

FIG. 3A shows one illustrative embodiment of the random sizing process where jerky treats of variable thicknesses, textures, shapes and sizes, with jagged, rough, ripped, or shredded product edges are made. To assist in the description of this process, it is helpful to first discuss conventional approaches to cutting systems.

In conventional continuous cutting systems, cross-cutting and dicing are processes in which the cutting elements are horizontal or perpendicular to the direction of the motion of the product, which results in products that are typically uniform in shape. When cross-cutting processes are used, the product is typically cut by a blade or series of blades whose cutting edge is parallel to their rotational axis. The cutting circle of a crosscut blade is the circular path that the cutting edge of the blade travels while rotating about an axis. The size of the cut depends on the portion of product that crosses into the cutting circle when it comes into contact with the blade. Since cross-cuts are typically carried out with straight edge blades, it results in clean, uniform product edges.

Unlike the conventional method discussed in the preceding paragraph, FIG. 3A overviews a three-step process, consisting of a first cutting operation, followed by a change of product flow orientation, followed by a second cutting operation.

Figure 10:
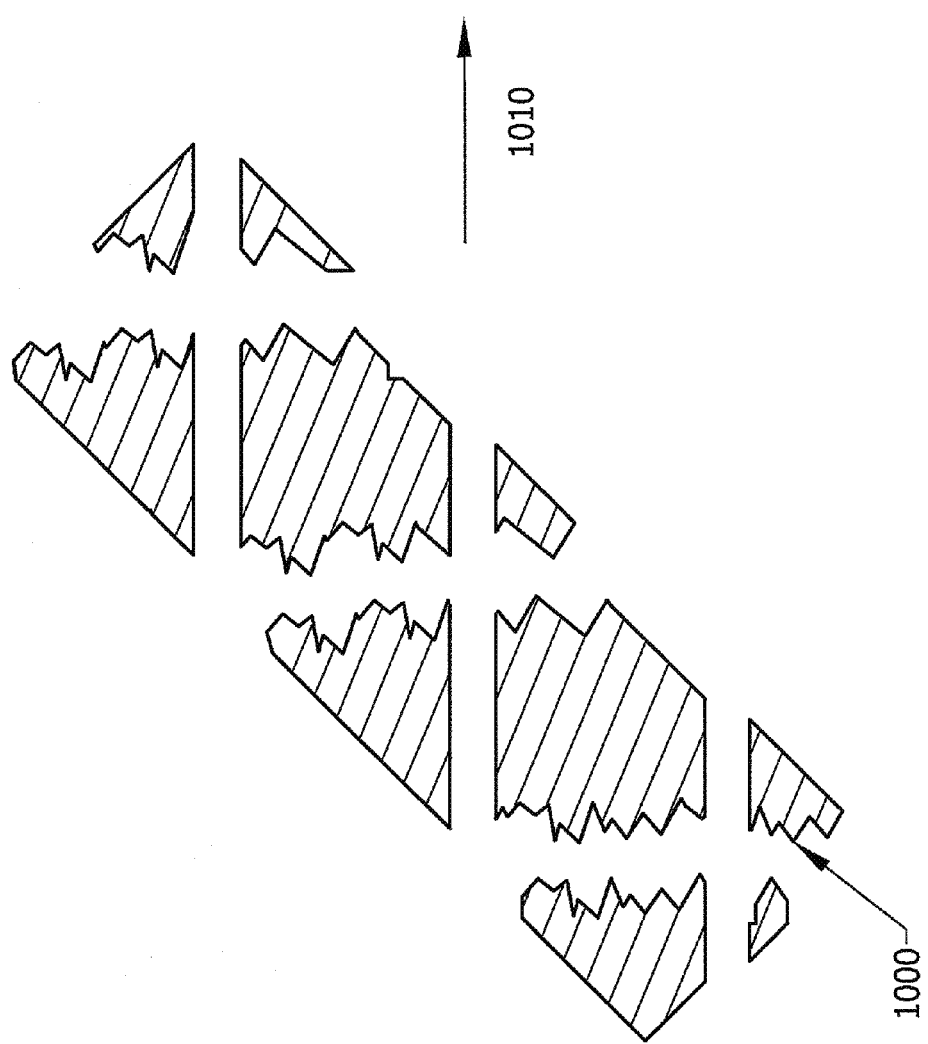
FIG. 10 shows final jerky product pieces that have jagged or pulled edges, according to an illustrative embodiment of the invention.

In the first step, dried and cooled jerky strips are fed through the first conveyor (300) to a first cutter/shredder (310) to obtain 6-8" long strips (320). Typically, the cutter/shredder used in this first cutting operation has a single mounted blade with a single cut surface. However, more complex cutters/shredders, with serrated or notched crosscut blades and holding spurs, can also be used in this step to increase the roughness and texture. The crosscut blade is notched to allow the blade to act as a set of teeth that dig into the product without completely separating the cutting section from the product main body. The main body is held in place by a device which may include holding spurs, roller(s), an overhead conveyor, etc. while the rotation of the notched crosscut blade pulls the cut section away from the main body. In the absence of the holding device, an additional process may be implemented to separate the product from the main body including but not limited to manual separation. The result is a non-linear/ripped product edge as shown in FIG. 10 or FIG. 11A.

In the second step, the 6-8" strips (320) are then transferred to an aligning conveyor (330). This conveyor switches the orientation of the strips and aligns the strips for being cut in a different orientation during the third step. The aligning conveyor also spaces the strips before placing it on the in-feed conveyor (340), which then feeds the strips to the next cutter/shredder (350) in an oblique orientation. The longitudinal axis of the strips can be oriented anywhere between 1 and 89° with respect to the direction of travel on the in-feed conveyor (340) for the next cutter/shredder (350), and is more typically between 30 and 60°.

The third step (340, 350, 360), involves another cutting/shredding operation (350), that uses a set of serrated or notched cutting blades or a single blade that makes multiple cuts along the same cutting circle. The random sizing process with these unique cross cut and shredding systems results in a variety of irregularly shaped pieces-similar to triangles, quadrilaterals, and other regular or irregular polygons-continuously being made in a production line so that each product that comes out is generally of a different size and shape than the previous one, which eventually results in a plurality of product pieces that are of substantially random shapes, sizes and texture.

Figure 5B:
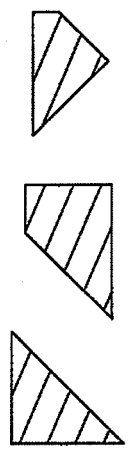
FIGS. 5A and 5B shows possible shaping patterns of the jerky product after the cutting/shredding process of FIG. 4 and just before the packaging step (185) of FIG. 1A, according to an illustrative embodiment of the invention.
Figure 5A:
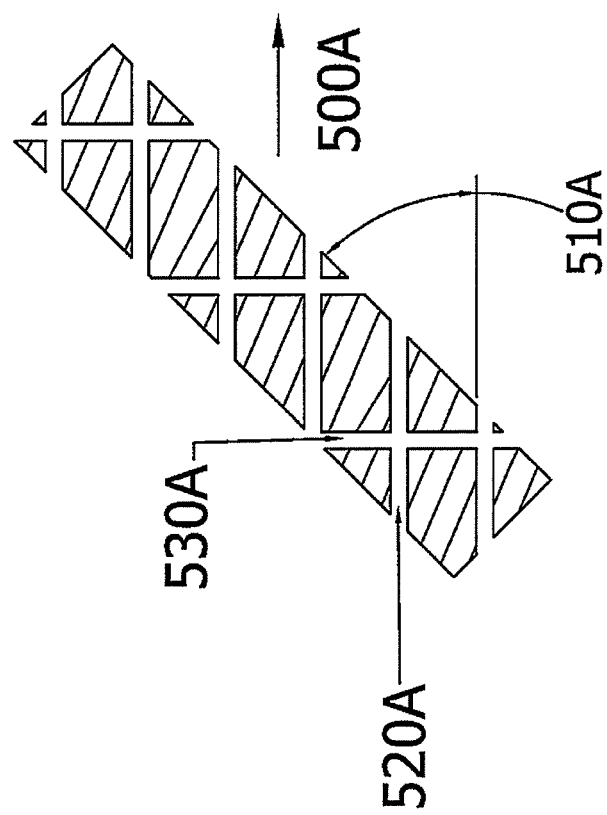
Figure 7C:
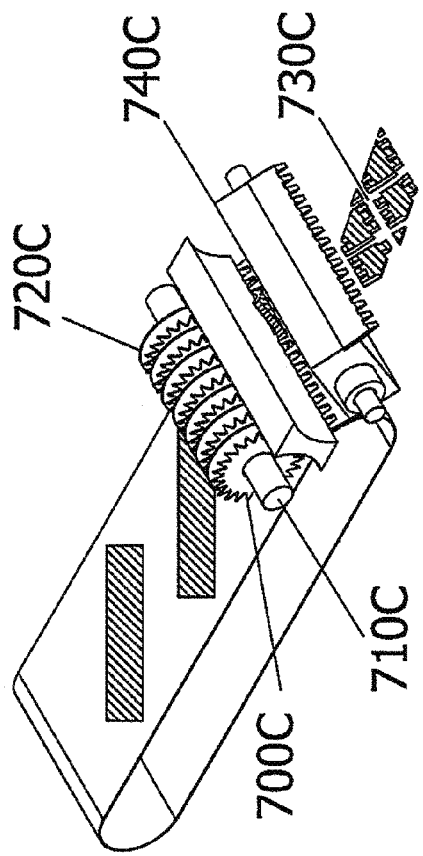
FIGS. 7A, 7B and 7C show different views of the cutting/shredding process (350) using notched crosscut blades and star shaped blades, according to an illustrative embodiment of the invention.
Figure 7B:
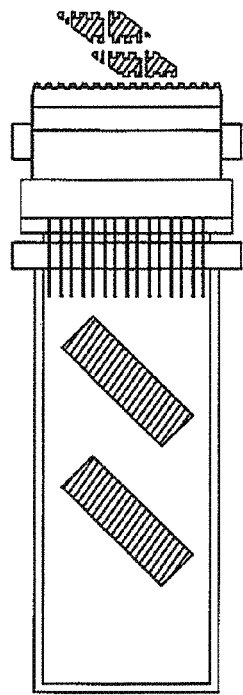
Figure 7A:
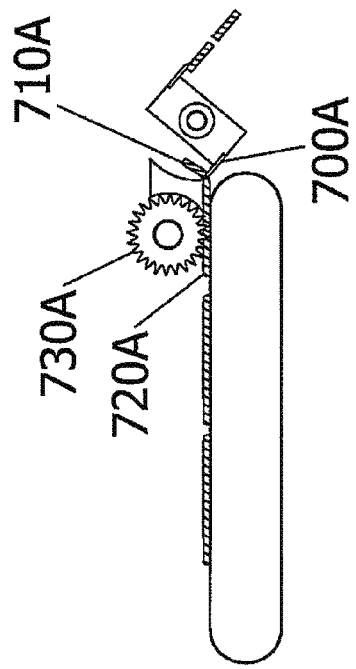

One illustrative embodiment of the second cutter/shredder operation (340-350) is illustrated in greater detail in FIGS. 4A-C, and in FIGS. 5A-B. This operation further changes the overall shape characteristics of the jerky. The cutter/shredder (350) has either a blade or blade assembly that will cut the interim product strips at two different times along the same cutting circle, and it cuts using both rotary and crosscut blades. The blade or blade assembly is the arrangement of notched straight blades that will eventually result in the complete separation of the product cutting section from the main body through shearing. A stepped cutting also results from the product being fed into the cutting circle and cut at different times. The angle between the cutting edges with respect to the crosscut rotational axis determines the time that will elapse between the initial and final cuts. The result is a generally non-linear product edge.

The rotary blades (410C), as shown mounted on the rotary blade shaft (420C), provide a unique cut (430C, 520A) along the direction of travel (500A). Meanwhile the crosscut blades (440C), as shown mounted on the crosscut spindle (450C), rotate about the crosscut shaft (460C) and provide a unique cut (470C, 530A) that is roughly perpendicular to the direction of travel. Due to the oblique orientation of the jerky strips (510A) relative to their direction of travel as they pass through the cutter (500A), the resulting product pieces emerge in forms that are similar to triangles, parallelograms, and other geometric and/or irregular shapes of varying sizes (FIG. 5B), such that when a number of edible pieces are sequentially produced and collected, the product distribution in terms of shape, thickness, size and texture, appear substantially random and irregular (see FIGS. 10, 11A and 11B).

Figure 8B:
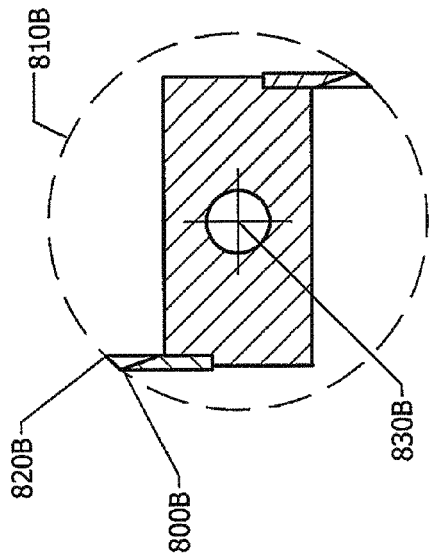
FIGS. 8A, 8B and 8C show further details and different views of dual cut crosscut blades mounted to a crosscut spindle (740C of FIG. 7), according to an illustrative embodiment of the invention.
Figure 8A:
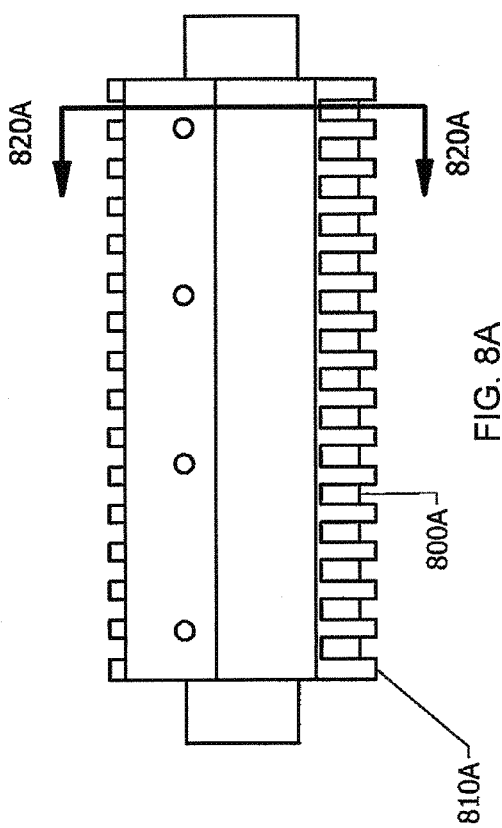
Figure 8C:
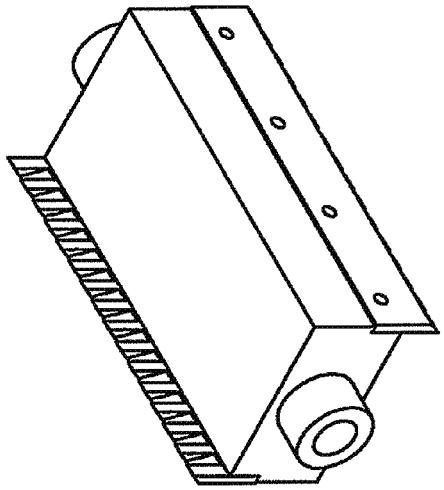
Figure 9:
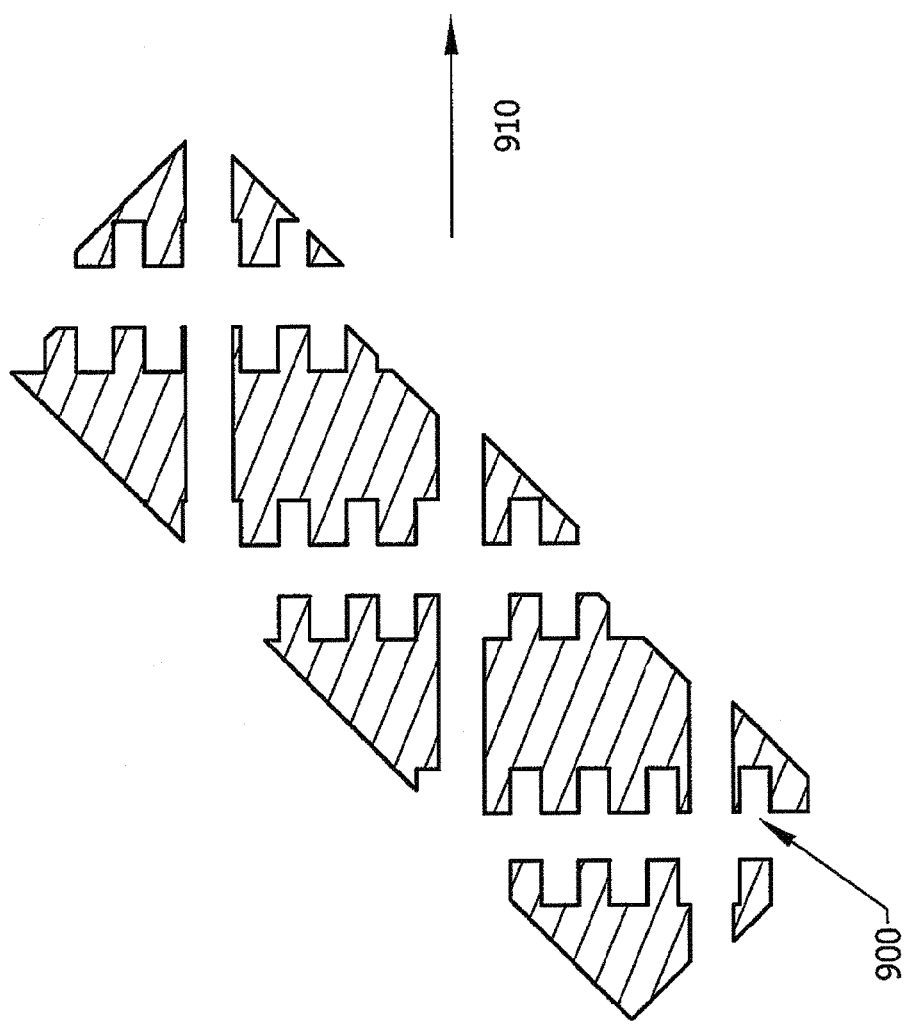
FIG. 9 shows possible shaping patterns for final jerky product pieces after a combination of notched and dual reduction cutting processes, according to an illustrative embodiment of the invention.

In the prior embodiment, the crosscut blades (440C) produce only a straight cut. The straight edge provides a clean and even cut along the product edge. In one embodiment of the subject invention, to give the beef jerky edges an even more natural and torn appearance and texture, the crosscut blades are notched (FIG. 6A) to obtain an uneven cut (730C). In the absence of a continuous cutting surface, the remaining edges of the crosscut blade (610A) penetrate the product like teeth. The motion of the notched crosscut blade (FIG. 6C and 700A) pulls/tears the lead section of the product (710A), away from the product remainder (720A) which is held in place by the sharp edges of star shaped blades (730A), and this is also illustrated in FIG. 8A. While this is not necessary, to simplify the assembly, the star shaped blades (700C) may be mounted on the same shaft (710C) as the rotary blades (720C). In the event that the notched crosscut blade does not effectively cut the product, crosscut blades with two cutting surfaces (as shown in FIG. 8B mounted on the crosscut spindle) may be used to ensure a thorough cut. The additional cutting surface (800A, 800B) must generally follow the same cutting circle (810B) as the primary cutting surface (810A, 820B), to provide a staggered clean cut along the product edge. The result, of either the notched crosscut blades (FIG. 6B) or the dual cutting surface blades (FIG. 8B), is a jerky product with uneven, torn edges that appear to be pulled apart by hand (FIG. 9 and FIG. 10). After the random sizing operation described above, the product is then packaged in any of the typical methods and processes used in the pet industry (185).

While the foregoing description explains the manufacturing process used to make the product, it is also important to note that the type and relative proportions of ingredients used in making the product can also play a role in making variable thickness, irregularly shaped pieces, as will be evident to one skilled in the art. In particular, the increased proportion of meat used in this process helps develop a rough texture that appears more like human grade beef jerky that is made from sliced muscle meat.

Two recipes (A and B) are shown below to demonstrate some typical proportions of proteins and other ingredients used in the beginning of the process (FIG. 1A at mixer 130) to make a jerky treat for animal consumption (numbers below are in weight percent):

| Component | Recipe A | Recipe B |
|---|---|---|
| Meat/Animal Protein | 60% | 65% |
| Plant Protein | 5% | 3% |
| Starches | 20% | 10% |
| Flavors | 14% | 20% |
| Preservatives | 1% | 2% |
| TOTAL | 100% | 100% |

While the recipes above are specific, TABLE 1 below illustrates the broader ranges of composition of the key components that can be used in conjunction with the process described herein to make proteinaceous jerky treats for animal consumption. Some of these combinations would also be useful for making long-lasting products for human consumption, as will be appreciated by one skilled in the art. Note that many of these starting ingredients (e.g., beef or chicken or vegetables) inherently contain water.

TABLE 1

| Category | Examples | Proportion (wt %) |
|---|---|---|
| Proteins | Chicken, beef, pork, turkey, veal, lamb, venison, duck, fish, seafood, crustaceans, imitation seafood products, or a combination thereof. Premium and lower grade meats, or offal, could also be used. Meat analogs such as soy or vegetable protein can also be used for developing | 40-95% |
| Flours/Starch/ Carbohydrates | Wheat, soy, corn, tapioca, etc., or a combination | 0-20% |
| Vegetables/Fruits | Apples, banana, sweet potato, cranberry, carrots, peas, etc., or a combination | 0-10% |
| Flavor enhancers | Sugar, salt, garlic, onion, digests. | 5-20% |
| Preservatives | Potassium sorbate, sorbic acid, butylated hydroxyanisole (BHA), butylated hydroxytoluene (BHT), mixed tocopherols, calcium propionate, zinc propionate, rosemary extract, citric acid, sodium erythobate, | 0.01-5% |

Accelerated testing studies have also indicated that recipes A and B produce pet products that are shelf stable for at least 18 months, maintaining a stabilized intermediate moisture content (15-30% by weight, usually 18-26%), and stabilized water activity (Aw ranging from 0.60 to 0.78, usually 0.65-0.75%) without refrigeration under normal conditions of storage in homes or stores that are reasonable and expected for the packaged pet foods industry. The ingredient mix, within the composition ranges in TABLE 1 provided above, can also be adjusted as needed by one skilled in the art to ensure that similar stabilized moisture content and water activity is achieved to create final packaged products that are semi-most and shelf-stable for at least 18 months.

Figure 1B:
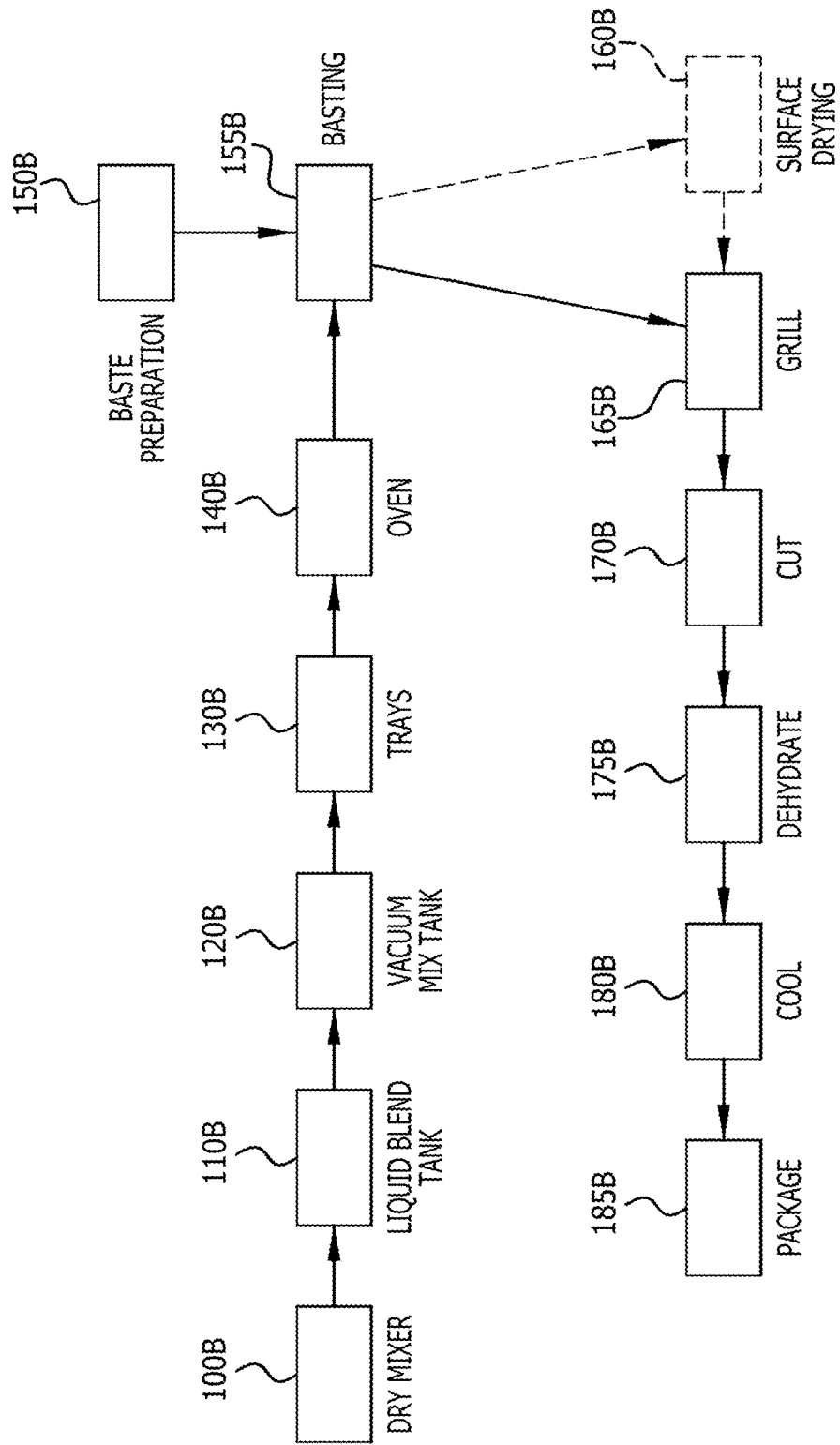
FIG. 1B is an overview of a process for making food products, such as pet treats, according to illustrative embodiments of the invention.

In embodiments of the invention generally illustrated in FIG. 1A, and shown more specifically in FIG. 1B, a process is provided for manufacturing grilled food product from proteinaceous material, e.g., whole chicken breast meat or whole chicken tender meat. In an initial processing step, dry ingredients including flavorings, preservatives, humectants, and other ingredients, are uniformly mixed and then added to water and other liquid ingredients in a liquid blend tank to form a slurry (100B, 110B). The details of the ingredients and proportions are described in TABLE 2.

TABLE 2

| Category | Examples | Proportion (wt %) | Whole chicken Recipe C (wt %) | Ground Chicken Recipe D (wt %) |
|---|---|---|---|---|
| Proteins | Chicken tenders, chicken breast, beef, lamb, veal, venison, duck, eggs, turkey, pork, or a combination. Premium and low grade meats, or offal, and fish, could also be used. | 40-90 | 83.8 | 58.1 |
| Flours/Starch/ Carbohydrates | Wheat, soy, tapioca, potato, rice, or a combination. | 0-30 | 3.1 | 16 |
| Flavor Enhancers | Animal fats, salt, sugar, garlic, onion, digests, | 1-15 | 3.2 | 8.5 |

TABLE 2-continued

| Category | Examples | Proportion (wt %) | Whole chicken Recipe C (wt %) | Ground Chicken Recipe D (wt %) |
|---|---|---|---|---|
| Preservatives/ Humectants | Potassium sorbate, sorbic acid, butylated hydroxyanisole (BHA), butylated hydroxytoluene (BHT), mixed tochopherols, calcium propionate, zinc propionate, rosemary extract, citric acid, sodium erythorbate, glycerin, propylene glycol. | 0.01-15 | 4.9 | 11.4 |
| Coating | Water, gums, grain starches, carboxymethyl cellulose (CMC), eggs, flavors, digests in various combinations. | 3-7 | 5 | 6 |
| | Totals (%) | | 100 | 100 |

While recipes C and D above are specific, TABLE 2 illustrates the broader ranges of proportions of the composition of key components that can be used in conjunction with the processes described herein to make proteinaceous food products, such as pet treats for animal consumption. Some of these combinations would also be useful for making long-lasting products for human consumption, as will be appreciated by one skilled in the art.

In this illustrative embodiment, whole pieces of chicken meat (breast and/or tender), which are thawed, are placed in a vacuum mix tank (120B) and then layered with the slurry prepared in the liquid blend tank (110B). The pieces of meat and the slurry are mixed in the tank (120B) under vacuum for a suitable amount of time for the meat to absorb ingredients of the slurry. The vacuum applied provides a pressure in the vacuum mix tank (120B) in a range from about 16 kPa to about 85 kPa. In an embodiment, the vacuum pressure in the liquid blend tank (120B) is about 16 kPa, which is held for about 20 minutes. Of course, the vacuum pressure has an indirect relationship with the time that the meat is exposed to the slurry under vacuum. This vacuum treatment to the meat facilitates infusion of the meat with slurry ingredients in the vacuum mix tank (120B).

The infused meat is removed from the vacuum mix tank (120B) and can be placed on trays (130B). The trays holding the infused meat are then transferred by carts or other means to a continuous or batched cooking operation (i.e., steam tunnel, steam oven, steam chamber, regular oven, or the like) to be cooked (140B). The infused meat is heated in the cooking operation until the internal temperature of the meat reaches a desired internal temperature. This internal temperature may range from about 125° F. to about 185° F. depending upon the type of proteinaceous material being cooked. In embodiments, the internal temperature may be any one of 145° F., 160° F., 165° F., 175° F. to about 180° F., or other temperature that a proteinaceous material must reach in order to be considered properly cooked. In this illustrative embodiment, the internal temperature is about 175° F. to about 180° F. After the meat reaches the desired internal temperature, it is considered cooked and is then removed from the cooking operation (140B) and coated with a basting solution (150B, 155B).

Referred to without limitation as a "coating" in TABLE 2, the basting solution may be prepared by mixing a blend of dry ingredients, including smoke essence and coloring, with water and other liquids (150B). The basting solution can be applied to the cooked meat (155B) by dipping the meat in the solution or by spraying or brushing the basting solution onto the meat. A purpose of the basting solution is to provide a smoke essence (detected by gustation and olfaction) to the meat. The basting solution also enhances searing of the cooked meat when it is grilled (165B) in later processing steps.

The basted meat is grilled on one or more sides with an electric or gas-fired grill machine (165B). The grill machine (165B) may be set to produce a grilling temperature within a range of about 300° F. to about 500° F. to grill the basted meat. The grilling temperature is the approximate temperature of the grilling machine's heating element. The duration of time that the basted meat is exposed to the grill has an indirect relationship with the grilling temperature. In other words, the higher the temperature, the shorter the grilling time required. As an illustrative example, the basted meat may be grilled for about 10 seconds at a grill temperature of about 300° F. In another example, the basted meat may be grilled for about 1 second at a grill temperature of about 400° F. or higher. In an embodiment, and before the meat is grilled (165B), the surface of the basted meat can be dried (160B) in an oven with heat (ranging from about 140° F. to about 160° F.) until the surface of the meat is sufficiently dry to the touch. The grilled meat is then transferred to a cutting process (180, 170B) in a manner similar to the other embodiments of the invention.

The grilled meat (300B, 300F, 300J, 300N) can be cut into a plurality of pieces with a cutting element, e.g., cross cut blade or similar. The cutting element can be positioned to make substantially vertical cuts through the grilled meat (resting on the cutting surface) at an angle of about 30 degrees to about 90 degrees from the long axis of the grilled meat. For example, vertical cuts through the grilled meat (300B) are shown in FIGS. 3B-3E at about 90 degrees to the long axis of the grilled meat. While in another embodiment, vertical cuts through the grilled meat (300F) are shown in FIGS. 3F-3I at about 45 degrees from the long axis of the grilled meat. In another embodiment of the cutting operation, the grilled meat can be cut into pieces by a cutting element that is positioned to make angular cuts at any angle other than a substantially vertical cut (e.g., more or less than about 90 degrees, or generally perpendicular, to cutting surface) from between about 25 degrees to about 90 degrees from the long axis of the grilled meat. In an illustrative example, angular cuts through the grilled meat (300J) are shown in FIGS. 3J-3M at about 45 degrees from the cutting surface (301J) and, also, at about 90 degrees from the long axis of the grilled meat (300J). While in another embodiment, angular cuts through the grilled meat (300N) are shown in FIGS. 3N-3Q at about 45 degrees from the cutting surface (301N) and, also, at about 45 degrees from the long axis of the grilled meat (300N).

The cutting operation provides a plurality of clean cut pieces with generally uniform cut surfaces. The embodiments of the cutting process result in a variety of pieces of meat product (320B, 320F, 320J, 320N) about 1 cm long with different sizes and shapes. The plurality of product pieces (320B, 320F, 320J, 320N) are generally randomized in shape and surface appearance (seared and grilled). Of course, the pieces of the meat product can be cut at a length that is more or less than about 1 cm and even subjected to additional cuts to make finer sized pieces, diced pieces, or the like.

The plurality of product pieces can be slow cooked to dehydrate them to reach finished product specifications (175B). The pieces may be dehydrated to a moisture of about 18% to about 25%. In this range of moisture, the pieces may have a water activity value of about 0.72 to about 0.78. In an embodiment, the moisture of the pieces is about 22%. After the dehydration operation described above, the plurality of pieces are cooled by refrigeration or ambient cooling and then packaged with any of the typical methods and processes used in the pet industry (180B, 185B). Recipe C of TABLE 2 produces pet products that are shelf-stable for up to about 18 months, maintain a stabilized intermediate moisture content (e.g., 18% to about 25%), and have stable water activity (e.g., 0.72 to about 0.78) without refrigeration under normal storage conditions in homes or stores, which are reasonable and expected for the packaged pet foods industry.

Figure 1C:
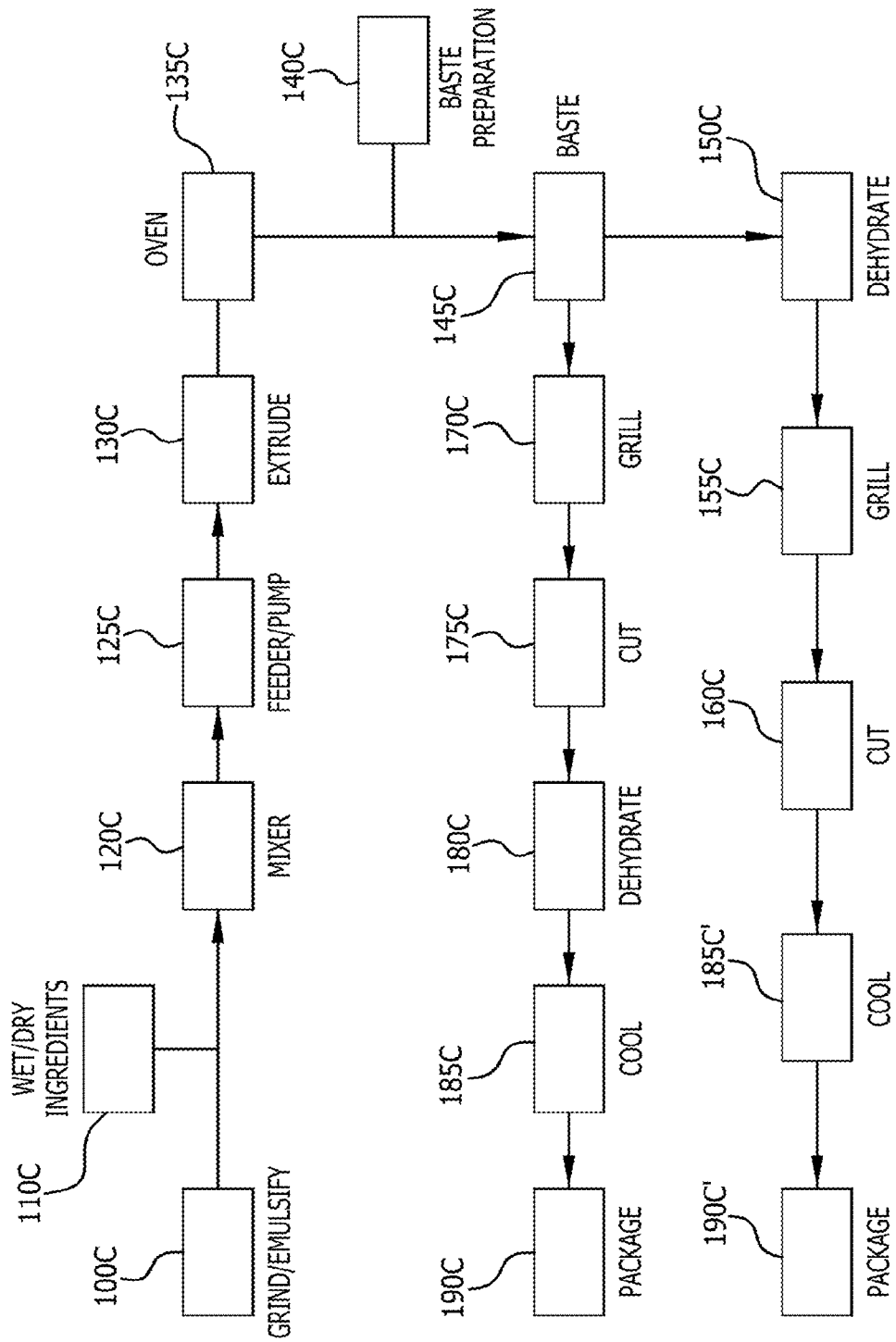
FIG. 1C is an overview of a process for making food products, such as pet treats, according to other illustrative embodiments of the invention.

In yet a further illustrative embodiment of the invention shown generally in FIG. 1A and more specifically in FIG. 1C, processes are provided for manufacturing grilled food products, such as pet treats, from ground proteinaceous material listed on TABLES 1-2, e.g., ground premium white chicken meat. In this embodiment, frozen or thawed chicken meat including, but not limited to, white meat or tenders, dark meat, or a combination of both, are ground with a grinder (100C) and later emulsified. This grinder has a plate with small openings (larger than 1/16" diameter but smaller than 1" diameter and in an embodiment, about 1/8" diameter). This grinding step (100C) and/or use of chicken meat can also contribute to the appearance and texture of the finished product.

In this illustrative embodiment, the ground meat can be batched and mixed in a ribbon or paddle mixer, typically a double ribbon flight mixer, sigma blade, solids screw, paddle mixer, or any similar mixing equipment common in food processing (120C). Dry ingredients and liquid ingredients are added to the meat batch in the mixer (110C, 120C). The details of the ingredients and their proportions are described in TABLES 1 and 2. The batch is mixed (120C) for a time to sufficiently mix the dry and wet ingredients into the meat (i.e., about 8 minutes) to create a meat emulsion. Note that similar results can also be attained by sourcing pre-ground and/or pre-mixed meat and wet and dry ingredients, and using this pre-mix as the starting material for the process shown in FIG. 1C and described below.

Figure 2C:
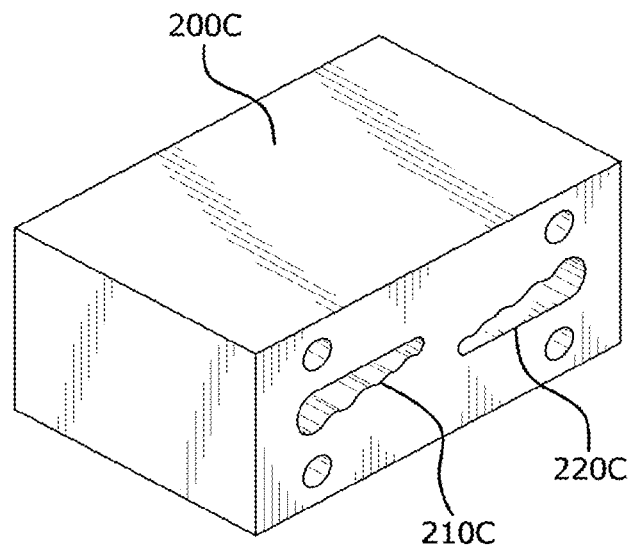
FIGS. 2C and 2D show details of other extrusion manifolds for the extruding processes (160, 130C) of FIGS. 1A-1C, according to an illustrative embodiment of the invention.
Figure 2D:
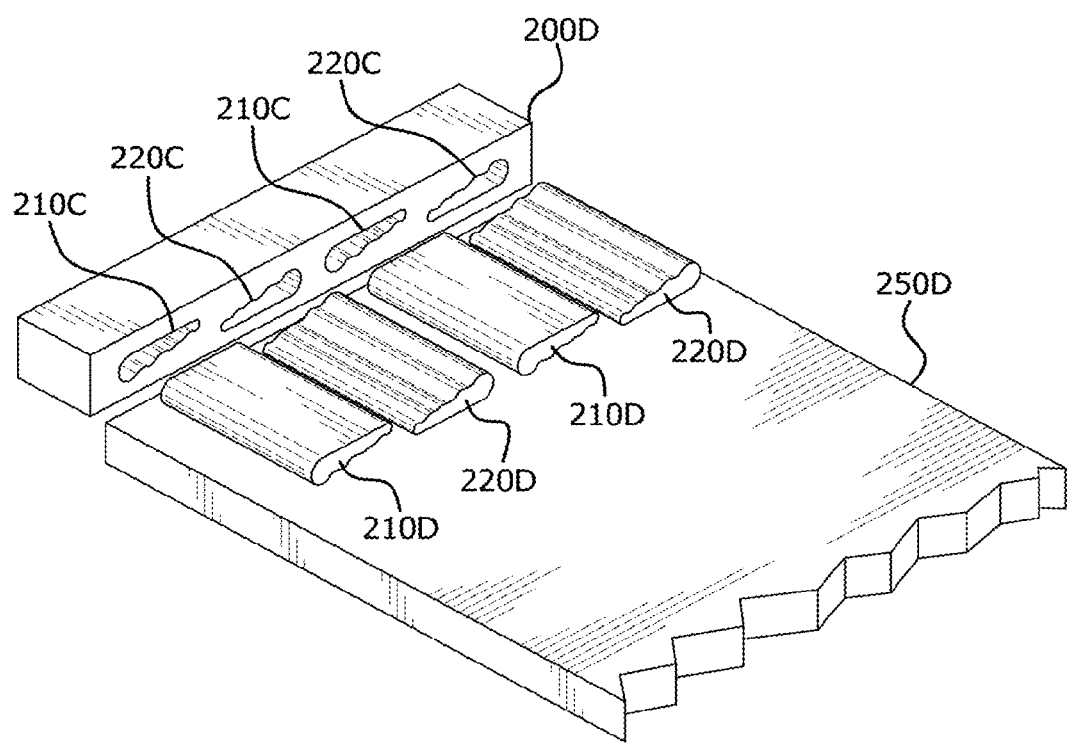

After the grind, the meat emulsion is conveyed to an extrusion manifold and fed (125C) by a pump, vacuum stuffer (i.e., Vemag or similar), or other operation through the manifold, e.g., 200C, 200D in FIGS. 2C and 2D. The meat emulsion can be extruded (130C) continuously through an extrusion manifold (200D) having generally irregular (as previously defined) die openings (210C, 220C). The die openings may vary in number, e.g., 2 die openings (210C, 220C) are shown in FIG. 2C, while 4 openings (210C, 220C) are shown in FIG. 2D. Of course, alternative extrusion manifolds may be used including those previously described with other embodiments of the invention and also as illustrated in FIGS. 2A-2B. The extrusion manifold (200C, 200D) creates extrudate formed in ropes that can be collected on a continuous belt conveyor (250D) which pulls on the ropes emerging from die openings of the manifold (200C, 200D). As the conveyer (250D) pulls the ropes, stress markings and partial tears are formed in the uncooked ropes. This will provide a visual appearance of randomly sized and torn meat in the finished product. The resulting ropes may be fed continuously by the conveyor (250D), as shown in FIG. 2D, to a cooking process (135C) or be cut into desired lengths using typical post-extrusion cutting processes as previously described. If the ropes are cut into lengths, the lengths of cut rope can be collected on trays, and the trays are then conveyed to the cooking process (135C) to be cooked.

As shown in FIG. 1C, the extrudate is then cooked in a continuous or batch cooking operation (135C) to reach a semi-rigid form. The extrudate can be cooked in the cooking operation to reach a desired internal temperature. This internal rope temperature may range from about 125° F. to about 185° F. depending on the type of proteinaceous material being cooked. In various embodiments, the internal temperature may be any one of 145° F., 160° F., 165° F., 175 to about 180° F., or other temperature to sufficiently cook the proteinaceous material. In this illustrative embodiment, the internal temperature is about 175° F. to about 180° F. After reaching the desired internal temperature, the cooked ropes are removed from the cooking operation and coated with a basting solution (140C, 145C).

The basting solution provides a smoke essence and also enhances the searing of the cooked ropes as the ropes are being grilled. The basting solution can be prepared by mixing a blend of dry ingredients including smoke essence and coloring with water and other liquids (140C) within the previously-discussed coating composition ranges of TABLE 2. The cooked ropes can be dipped in the basting solution, which can also be sprayed or brushed onto the cooked ropes.

After the basting step (145C), the basted ropes can be processed according to different sequences of processing steps to reach the finished packaged product. The basted ropes can be subjected to various sequences of processing steps. In this illustrative embodiment, the basted ropes can be dehydrated (150C), grilled (155C), and cut (160C) before being cooled (185C') and packaged (190C').

In the dehydration operation (150C), the basted ropes are dried to a moisture of about 18% to about 25% similar to the dehydration operation for whole meat as shown in FIG. 1B and previously described. After the dehydration operation, the basted ropes are grilled (155C) on one or more sides (similar to whole chicken meat processing of FIG. 1B) with an electric or gas-fired grilling machine. The grilled meat is then transferred to a cutting process to be cut into pieces (160C) similar the cutting operations as shown in FIG. 1B and previously described.

In the cutting operation (160C), the grilled ropes can be cut in any manner disclosed in this application. The ropes can be cut with a cutting element (such as cross cut blade, two guillotine cutters, or the like) that is generally positioned to make substantially vertical cuts (i.e., about 90 degrees from the cutting surface) at an angle of about 25 degrees to about 90 degrees to the long axis of the grilled ropes, e.g., about 90 degrees from the long axis of the grilled ropes as shown in FIGS. 3B-3E, about 45 degrees from the long axis of the grilled ropes as shown in FIGS. 3F-3I, or other angle to the long axis of the ropes. In another embodiment, the grilled ropes can be cut with a cutting element that is generally positioned to make angular cuts at any angle other than a substantially vertical cut (i.e., more or less than about 90 degrees to the cutting surface) from between about 25 degrees to about 90 degrees from the long axis of the grilled ropes, such as those shown in FIGS. 3J-3M and FIGS. 3N-3Q. The result of the cutting process (160C) is a variety of cut pieces of grilled ropes about 1 cm long with different sizes and shapes. The plurality of product pieces are of generally random shapes and surface appearance. Of course, the pieces of meat product may be cut at a desired length that is more or less than about 1 cm or cut further into finer pieces, e.g., thinner slices, diced, etc. After the cutting process (160C), the cut pieces are cooled (185C') by refrigeration or ambient cooling and then packaged (190C') with any of the typical methods and processes used in the pet industry.

In an alternative embodiment, the processing sequence for the basted ropes can be modified. For example, the basted ropes can be grilled (170C) and then cut (175C) by the cutting operation of the invention before being dehydrated (180C), cooled (185C), and packaged (190C).

The finished product obtained by the processes of FIGS. 1B and 1C and described above comprise a shelf-stable food treat exemplified in FIG. 12. This product has opposed first and second cut surfaces resulting from the cutting operations of the invention. The first and second surfaces are substantially planer and are generally parallel to one another. In an alterative embodiment, the first and second surfaces may have ridges or other demarcations resulting from the type of cutting assembly used in the cutting operation. The median distance between the opposed first and second surfaces of the product generally defines the product's length. The product includes a third nonlinear rough-textured surface, which is the surface that has one or all of the grilling effects, e.g., searing, grill marks, and smoke essence. This third surface is adjacent to the first and second surfaces and predominantly forms the circumference of the pieces of the finished product. Based on recipes C or D, the finished shelf-stable product comprises generally about 40% to about 95% by weight of proteinaceous material, which can be selected from any one or more of the proteinaceous materials described on TABLES 1 or 2.

It will be apparent to one skilled in the art that the final shape, texture, and surface appearance of the end products of the invention, and their size and thickness distributions, can be pre-designed and/or manipulated on-the-fly during the manufacturing process by pre-selecting and/or dynamically adjusting various process variables. These variables include, but are not limited to, the following:

1. Product orientation with respect to the cutting elements in either of the two cutting operations. FIG. 3A indicates a roughly perpendicular orientation between the first conveyor alignment (300 to 320) and the first cutter/dicer (310) (hereafter "Angle 1"), and between the final conveyor alignment (340 to 360) and the second cutter/dicer (350) (hereafter "Angle 2"). In alternative embodiments, Angle 1 and/or Angle 2 can be made oblique, in practice typically between 30° and 150°. Further, Angle 1 can be the same or completely different from Angle 2. The cutting element may also be used to cut the product in one cutting operation (rather than in two or more series of cuts made to product that must be repositioned). For example, the cutting element (310B, 310F) may be set with a perpendicular orientation between it and the cutting surface (301B, 301F) to make cuts perpendicular to the long axis of product (FIGS. 3B-3D), cuts at about 45° degrees from the long axis of product (FIGS. 3F-3H), or other angle to the product's long axis. The cutting element (310J, 310N) may also be set with an orientation between it and the cutting surface (301J, 301N) to make angled cuts, including compound cuts, to the product (i.e., 45 degrees to the cutting surface and perpendicular to the long axis of the product (FIGS. 3J-3L), or, alternatively, 45 degrees to the cutting surface and 45 degrees to the long axis of the product (FIGS. 3N-3P)). Of course, the cutting assembly may be set at any angle that can make the angled cuts including compound angled cuts.
2. Conveyor flow orientation between first and second cutting operations. In FIG. 3A, the angle between flow in the first cutting operation and the intermediate conveyor (330) (hereafter "Angle 3"), is roughly 90° ; the angle between the intermediate conveyor and the second cutting operation (340, 350, 360) (hereafter "Angle 4"), is roughly 45°. In alternative embodiments, Angle 3 and Angle 4 can be varied between 20 and 70°, and is preferably between 35 and 55°.
3. Pattern, size and shape of extrusion slots. In FIG. 2A, the extrusion slots are generally of the same length, but of different patterns. This can be changed in a wide variety of ways, with the length of each slot being different from each other to more variation in the width of the slots. In FIG. 2C, the extrusion slots are generally the same length with the same or similar patterns. The design is of course dependent on the end-user and market preferences; for instance, the small dog segment may require smaller, more uniform slits, whereas larger variations are possible for large dogs. The die openings may be modified in a manner to provide extrudate which, when cooked, will appear to be a piece of meat.
4. Width of the conveyor belt and size of the cutter/shredder. If a wider belt or a larger cutter/shredder were utilized, then the jerky strips could be a longer length, but these dimensions can be adjusted as needed based on the size of the pet the product is designed for, and other consumer and market preferences. Also, there is a wide variety of the types of blades that can be used in the cutter/shredder.
5. Speed of the conveyor belt and/or cutting frequency/speed of the blade(s) in the cutting operation. Changing the speed of the conveyor belt allows dynamic control and variation in the size and texture of the product. For example, slower (or faster) speeds in conveyor (300-320) will result in smaller (or larger) pieces being produced, for the same cutting frequency of the blades. The speeds can also be varied differently in different conveyors and/or blades.
6. Variations in compositions (ground or whole meat, type of proteinaceous material, and dry and wet ingredients) within the ranges prescribed in TABLES 1-2. For instance, increasing the meat concentrations and lowering or eliminating carbohydrates will increase the leathery, wrinkled texture of the product. Further, the use of whole meat rather than ground meat will impact the final texture and surface appearance of finished product. Note that increasing the ratio of premium muscle meat to lower grade meat (including offal), will also increase the natural wholesome look, but this must be balanced with commercial considerations such as cost and consumer preferences. To some extent, the composition can also be adjusted dynamically during processing by adding multiple feed points, each independently controllable, instead of the fixed ingredients addition shown as (120) in FIG. 1A. Also, pulling on extrudate emerging from die openings will create a torn meat appearance in the finished product.
7. Further processing with additional alignment conveyors and cutting operation angles after the end of the second cutting operation (350), to get finer cuts and an increase in randomness and irregularity of the pieces. One skilled in the art can also envision the possibility of using just one cutter/shredder operation twice. In other words, the output of the cutting operation can be sent back through a recycling conveyor to the beginning of the cutting operation, at a different angle, so that the product is processed a second time through the same cutter. In principle, this can be extended to as many cutting and re-feeding operations as necessary, and limited only be the requirements of the end product and its cost.

8. Use of one or more (a) "cookie cutter" type stampers or irregular patterns and shapes, or (b) cutters/slicing blades, that stamp/slice down sequentially after the extrusion step (160, 130C) on to the conveyor belt carrying the extrudate strips, at an angle that is not perpendicular to the longitudinal movement of the conveyor, such that the strips get cut out in irregular patterns after one (or more cuts) from these stampers/cutters.

9. Adjusting the force and direction of the cuts in one or more of the cutter/shredder operations. The angular force of the cutting blades can be tuned to adjust the degree to which the product strips are roughly torn by the blade edges rather than more precisely cut in accordance with the blade contours. To achieve the desired level of tearing/shredding, the angular force of the blades should be tuned relative to the texture and overall consistency of the dried product strips.

10. Changing the feed orientation for the second cutting operation without the use of an alignment conveyor. For instance, referring to 3A, any commercially-available pick and place equipment may be used instead of alignment conveyor (330) to pick up, change the orientation of the strip(s), and place them back on the same conveyor (300-320) which will then directly feed into the second cutting operation (340-360). Another option is to have the output (320) feed into a constantly revolving/tumbling container that randomly shuffles the pieces as they exit back onto the same conveyor in random orientations before being fed into the next cutting/shredding operation.

11. Changing the conditions of the emulsion. For instance, referring to FIGS. 1A-1C, whole or ground proteinaceous material may be mixed with flavorings that enhance the taste of the finished product. Although a feature of the invention is a food product with a smoke essence, other flavorings may be used, e.g., teriyaki, hot spice, and the like.

12. Surface coatings and cooking conditions. For instance, referring to FIGS. 1A-1C, coatings may be applied to cooked extrudate and whole meat to make the extrudate and whole meat, after being grilled, appear as if the meat was either grilled at home or in a smoke house and emit an aroma of smoke.

While the invention has been described in conjunction with specific embodiments, it is evident that many alternatives, modifications, permutations and variations will become apparent to those skilled in the art in light of the foregoing description. Accordingly, it is intended that the present invention embraces all such alternatives, modifications and variations as falling within the scope of the claims below.

What is claimed is:

1. A process for manufacturing pet treats comprising:
mixing ground proteinaceous material with preservatives and flavor enhancers to form a blend of foodstuff;
extruding the foodstuff through at least one die opening that is at least partially irregular to form at least one strip of extrudate that is at least partly irregular in shape;
pulling the strip of extrudate away from the die opening to create partial tears and stress markings on the extrudate;
heating the strip of extrudate to an internal temperature to obtain a formed strip;
coating the formed strip with a solution to obtain a basted strip;
grilling the basted strip to obtain a seared strip with grill marks; and
cutting the seared strip with a cutting element in a single cutting operation into a plurality of pieces of pet treats, wherein the cutting element is set at a first angle relative to a surface of a cutting operation on which the seared strip rests and also at a second angle to a long axis of the seared strip.

2. The process of claim 1 wherein the plurality of pieces of pet treats are semi-moist.

3. The process of claim 1 wherein the ground proteinaceous material is selected from the group comprising one or more of the following: beef, chicken, pork, turkey, lamb, veal, venison, offal, soy, fish, seafood, or vegetable protein.

4. The process of claim 1 wherein the internal temperature is in a range of about 125.degree. F. to about 185.degree. F.

5. The process of claim 1 wherein the heating occurs over a time period of about 4 to about 8 hours.

6. The process of claim 1 wherein the solution comprises coloring to enhance a seared appearance on the surface of the seared strip and flavoring to provide a smoked essence to the seared strip.

7. The process of claim 1 wherein the process comprises a further step of dehydrating the basted strip prior to grilling the basted strip.

8. The process of claim 7 wherein the basted strip is dehydrated to a water activity in a range from about 0.72 to about 0.78.

9. The process of claim 1 wherein the process comprises a further step of dehydrating the plurality of pieces of pet treats.

10. The process of claim 9 wherein the plurality of pieces of pet treats are dehydrated to a water activity in a range from about 0.72 to about 0.78.

11. The process of claim 1 wherein the first angle relative to the surface of the cutting operation ranges from about 30 degrees to about 150 degrees.

12. The process of claim 11 wherein the first angle is about 45 degrees.

13. The process of claim 11 wherein the first angle is about 90 degrees.

14. The process of claim 1 wherein the second angle relative to the long axis of the grilled strip ranges from about 25 degrees to about 155 degrees.

15. The process of claim 14 wherein the second angle is about 90 degrees.

16. The process of claim 14 wherein the angle is about 45 degrees.

17. The process of claim 1 wherein the process comprises packing the plurality of pieces of pet treats.

18. The process of claim 1 wherein the plurality of pieces of pet treats are shelf stable.

19. The process of claim 1 wherein the pet treats cumulatively produced during the process generally appear in random sizes.

20. The process of claim 1 wherein the pet treats have surfaces that are analogous to that of pieces of home-cooked grilled meat.

21. A continuous process for making a pet treat in the form of a grilled piece of meat comprising:
mixing proteinaceous material with preservatives and flavor enhancers to obtain a foodstuff;
heating the foodstuff to an internal temperature to obtain a formed foodstuff;
coating the formed foodstuff with a solution to obtain a basted foodstuff;
grilling the basted foodstuff to obtain a seared foodstuff having grill marks; and
cutting the seared foodstuff having grill marks with a cutting element in a single cutting operation to form a plurality of pieces of pet treats, wherein the cutting element is set at a first angle to a surface of a cutting operation on which the seared foodstuff rests and also at a second angle to the long axis of the seared foodstuff.

22. The continuous process of claim 21 wherein the proteinaceous material is selected from the group comprising one or more of the following: beef, chicken, pork, turkey, lamb, veal, venison, offal, soy, fish, seafood, or vegetable protein.

23. The continuous process of claim 22 wherein the process comprises grinding proteinaceous material before mixing it with preservatives and flavor enhancers.

24. The continuous process of claim 23 wherein the process comprises extruding ground proteinaceous material through at least one die opening that is at least partially irregular to form at least one strip of foodstuff that is at least partly irregular in shape.

25. The continuous process of claim 24 wherein the process comprises pulling the strip of foodstuff away from the die opening.

26. The continuous process of claim 25 wherein the pulling of the strip of foodstuff away from the die opening creates partial tears and stress marks in the foodstuff.

27. The continuous process of claim 26 wherein the proteinaceous material comprises pieces of formed foodstuff.

28. The continuous process of claim 22 wherein the proteinaceous material comprises whole chicken breast meat or whole chicken tender meat.

29. The process of claim 28 wherein the preservatives and flavor enhancers are mixed into a slurry.

30. The process of claim 29 wherein the slurry comprises humectants and functional ingredients.

31. The process of claim 29 wherein the mixing of the proteinaceous material and the slurry occurs with vacuum applied for a mixing time to promote absorption of the slurry into the proteinaceous material.

32. The process of claim 31 wherein the vacuum applied is a pressure in a range of about 16 kPa to about 85 kPa.

33. The process of claim 32 wherein the vacuum applied is about 16 kPa.

34. The process of claim 31 wherein the mixing time ranges from about 5 minutes to about 30 minutes.

35. The process of claim 34 wherein the mixing time is about 20 minutes.

36. The continuous process of claim 21 wherein the internal temperature is a temperature in a range of about 125.degree. F. to about 185.degree. F.

37. The continuous process of claim 21 wherein the heating occurs over a time period of about 4 to about 8 hours.

38. The continuous process of claim 21 wherein the solution comprises coloring to impart a seared appearance on the surface of the seared foodstuff and flavoring to provide a smoked essence to the seared foodstuff.

39. The continuous process of claim 21 wherein the process comprises the further step of dehydrating the basted foodstuff prior to grilling the basted foodstuff.

40. The continuous process of claim 39 wherein the basted foodstuff is dehydrated to a water activity in a range from about 0.72 to about 0.78.

41. The continuous process of claim 21 wherein the process comprises the further step of dehydrating the plurality of pieces of pet treats.

42. The continuous process of claim 41 wherein the plurality of pieces of pet treats are dehydrated to a water activity in a range from about 0.72 to about 0.78.

43. The continuous process of claim 21 wherein the first angle relative to the surface of the cutting operation ranges from about 30 degrees to about 150 degrees.

44. The continuous process of claim 43 wherein the first angle is about 45 degrees.

45. The continuous process of claim 43 wherein the first angle is about 90 degrees.

46. The continuous process of claim 21 wherein the second angle relative to the long axis of the grilled strip ranges from about 25 degrees to about 155 degrees.

47. The continuous process of claim 46 wherein the second angle is about 90 degrees.

48. The continuous process of claim 46 wherein the second angle is about 45 degrees.

49. The continuous process of claim 21 wherein the process comprises packing the plurality of pieces of pet treats.

50. The continuous process of claim 21 wherein the plurality of pieces of pet treats are shelf stable.

51. The continuous process of claim 21 wherein the plurality of pieces of pet treats are semi-moist.

52. The continuous process of claim 21 wherein the pet treats cumulatively produced during the process generally appear in random sizes and shapes.

53. The continuous process of claim 21 wherein the pet treats have a surface that is analogous to pieces of home-cooked grilled meat.

* * * * *